US007632100B2

(12) United States Patent
Allen et al.

(10) Patent No.: US 7,632,100 B2
(45) Date of Patent: Dec. 15, 2009

(54) BRACHIAL PLEXUS SIMULATOR

(75) Inventors: Robert Allen, Baltimore, MD (US);
Edith Gurewitsch, Baltimore, MD (US);
Tara Johnson, Kingsville, MD (US);
Vanessa LaPointe, Ottawa (CA)

(73) Assignee: Birth Injury Prevention, LLC, Baltimore, MD (US)

( * ) Notice: Subject to any disclaimer, the term of this patent is extended or adjusted under 35 U.S.C. 154(b) by 363 days.

(21) Appl. No.: 11/623,729

(22) Filed: Jan. 16, 2007

(65) Prior Publication Data
US 2007/0172804 A1    Jul. 26, 2007

Related U.S. Application Data

(63) Continuation-in-part of application No. 11/221,388, filed on Sep. 6, 2005, now Pat. No. 7,465,168.

(60) Provisional application No. 60/606,910, filed on Sep. 3, 2004.

(51) Int. Cl.
*G09B 23/28* (2006.01)

(52) U.S. Cl. .................................................. 434/273

(58) Field of Classification Search ................ 434/262, 434/267, 272, 274, 273; 73/862.044, 862.045, 73/862.338, 862.627
See application file for complete search history.

(56) References Cited

U.S. PATENT DOCUMENTS

| | | | |
|---|---|---|---|
| 88,432 A | 4/1869 | Aylworth | |
| 451,675 A | 5/1891 | Klautsch | |
| 2,127,774 A | 8/1938 | Jacobs | |
| 2,495,568 A | 1/1950 | Coel | |
| 2,551,433 A | 5/1951 | Graves | |
| 3,124,901 A | 3/1964 | Beebe | |
| 3,147,566 A | 9/1964 | Hong Ong | |
| 3,303,605 A | 2/1967 | Henry | |
| 3,557,471 A | 1/1971 | Payne | |
| 3,664,038 A | 5/1972 | Searle | |
| 3,707,782 A | 1/1973 | Alderson | |
| 3,719,913 A * | 3/1973 | DuBose et al. | ................ 338/2 |
| 3,740,871 A | 6/1973 | Berton | |
| 3,753,301 A | 8/1973 | Daniel | |
| 3,797,130 A | 3/1974 | Knapp | |
| 3,822,486 A | 7/1974 | Knapp | |

(Continued)

OTHER PUBLICATIONS

Gonik, Bernard, Robert Allen, and Jagadish Sorab. "Objective Evaluation of the Shoulder Dystocia Phenomenon . . . " Obstetrics and Gynecology 74 (1989): 44-47.

(Continued)

*Primary Examiner*—Kurt Fernstrom
(74) *Attorney, Agent, or Firm*—PatentBest; Andrew McAleavey

(57) ABSTRACT

A brachial plexus simulator is disclosed. The brachial plexus simulator comprises a head, a spinal assembly, and a simulated brachial plexus. The head may be weighted to a biofidelic weight and may include a tilt sensor. The spinal assembly comprises a simulated spine mounted for extension. The simulated brachial plexus comprises a network of nerve tubing that is attached relative to the simulated spine at appropriate points so as to mimic the connectivity, shape, and compliance of the brachial plexus. The nerve tubing may be filled with a fluid material whose resistance or other electrical properties change with its length, such as mercury. Maternal and fetal birthing simulators are also disclosed.

20 Claims, 21 Drawing Sheets

U.S. PATENT DOCUMENTS

| | | |
|---|---|---|
| 3,824,709 A | 7/1974 | Knapp |
| 3,826,019 A | 7/1974 | Knapp |
| 3,866,350 A | 2/1975 | Goldfarb |
| 3,916,535 A | 11/1975 | Hewson |
| 4,395,235 A | 7/1983 | Becker |
| 4,461,085 A * | 7/1984 | Dewar et al. .................. 33/534 |
| 4,575,351 A | 3/1986 | Gonzalez |
| 4,611,998 A | 9/1986 | Ramamurthy |
| 4,734,039 A | 3/1988 | Thompson |
| 4,773,865 A | 9/1988 | Baldwin |
| 4,797,104 A | 1/1989 | Laerdal |
| 4,820,236 A | 4/1989 | Berliner |
| 5,104,328 A | 4/1992 | Lounsbury |
| 5,259,765 A | 11/1993 | Richards |
| 5,295,835 A | 3/1994 | Scheinberg |
| 5,528,943 A | 6/1996 | Smrcka |
| 5,540,592 A | 7/1996 | Scheinberg |
| 5,853,292 A | 12/1998 | Eggert |
| 5,941,757 A | 8/1999 | Jurmain |
| 6,022,263 A | 2/2000 | Liu |
| 6,193,519 B1 | 2/2001 | Eggert |
| 6,238,215 B1 * | 5/2001 | Jurmain et al. .............. 434/270 |
| 6,503,087 B1 | 1/2003 | Eggert |
| 6,749,433 B2 | 6/2004 | Kassai |
| 6,758,676 B2 | 7/2004 | Eggert |
| 6,997,718 B1 | 2/2006 | Boettcher |
| 2005/0106545 A1 * | 5/2005 | Heruth et al. ............... 434/267 |

OTHER PUBLICATIONS

Crofts, Joanna F., et al., "Shoulder Dystocia Training Using a New Birth Training Mannequin," BJOG 112 (2005): 997-999.

Gherman, Robert B., et al., "Shoulder Dystocia: The Unpreventable Obstetric Emergency with Empiric Management Guidelines," A. J. Obstet. & Gyn., Article in Press, 2006.

* cited by examiner

BRACHIAL PLEXUS SIMULATOR

CROSS-REFERENCE TO RELATED APPLICATIONS

This application is a continuation-in-part of U.S. patent application Ser. No. 11/221,388, filed on Sep. 6, 2005 now U.S. Pat. No. 7,465,168, which claims priority to U.S. Provisional Patent Application No. 60/606,910, filed on Sep. 3, 2004. The contents of both of those applications are incorporated by reference herein in their entirety.

BACKGROUND OF THE INVENTION

1. Field of the Invention

The invention generally relates to the field of medical simulators, and more particularly, to the field of birthing simulators.

2. Description of Related Art

Simulators are devices that simulate or mimic the functions or responses of some portion of a natural system. A medical simulator typically simulates the functions or responses of some portion of a human or other animal body. Medical simulators have a variety of uses. For example, they can be used to train medical professionals and paraprofessionals in basic clinical procedures, they can be used by physiologists, engineers, and clinicians in research activities, and they can provide exposure to and training for a number of physiological conditions that are rarely seen in clinical settings. Ultimately, clinicians and researchers are free to practice on—and occasionally fail in their attempts—with a medical simulator, whereas failure in a clinical setting may cause severe harm or death.

Typically, a medical simulator is comprised of some combination of mechanical, electromechanical and, occasionally, software components. The designer of a medical simulator must balance two competing factors, biofidelity and complexity. Stated simply, a simulator that is not faithful to the system that it tries to simulate, and thus cannot produce a realistic simulation, may be of limited use. However, a simulator that is too faithful or too complex can be difficult to construct, difficult to use, and difficult to maintain, all of which detract from the experience of using it. Therefore, a good simulator is faithful enough to include the important functions and structures for the part or system that is being simulated without being so complex as to be burdensome.

Birthing is one physiological process that is useful to simulate, for several reasons. First, while the birthing process itself is a natural process that often concludes without complications, even in an uncomplicated birth, obstetric procedure can cause injury to the fetus and the mother. Moreover, while many births occur without complications, some births do not. Of the different types of complications that may occur, a number of them represent potentially life-threatening obstetric emergencies. Birthing simulators allow clinicians and researchers to research and train for complications and obstetric emergencies without risking fetal or maternal injury.

Shoulder dystocia (SD) is one example of an infrequent and potentially life-threatening birthing complication. In SD, the anterior fetal shoulder is impacted on the maternal symphysis pubis (pubic bone), which impedes the delivery and requires the clinician to perform additional maneuvers to deliver the fetus safely. Potential consequences of improper delivery techniques affect both the mother and the fetus and may range from mild discomfort to fetal paralysis, and in extreme cases, fatality. SD is uncommon; it is reported in only 0.2% to 4% of all vaginal births, although SD may be under-reported because the diagnosis is somewhat subjective, since the clinician cannot actually see the shoulder impaction.

Whatever the actual incidence of SD is, because it is uncommon and often unexpected, practicing clinicians only encounter SD infrequently and many may have never encountered a case of severe SD, the type of case most likely to be associated with injury. As desirable as it would be to simulate SD and other complicated births, the relative lack of biofidelity in existing birthing simulators makes it difficult to create a realistic simulation that allows clinicians to appreciate the nature of the problem and practice the necessary maneuvers.

The brachial plexus is the main collection of nerve fibers that arise in the upper spine (C5-C8 and T1 vertebrae) and extend into the arm to innervate it. Traumatic injury to the brachial plexus, caused by improper obstetric procedure or excessive traction force during complications like SD, can result in loss of sensation in or paralysis of the arm. However, the brachial plexus is a complex structure that includes multiple nerves branching in different directions; therefore, it can be difficult to predict whether a particular obstetric complication, or the application of a particular level of force, will cause injury to the brachial plexus.

SUMMARY OF THE INVENTION

One aspect of the invention relates to a birthing simulator. The birthing simulator comprises a pelvis, a perineum, at least a portion of a left leg, at least a portion of a right leg, and a compliant, deformable covering. The gynecoid pelvis is adapted for rotation about a horizontal axis of rotation. The perineum includes an external vaginal opening connected to the gynecoid pelvis so as to form a simulated birth canal. The left and right leg portions are moveably connected to the pelvis such that movement of one or more of the left or right leg portions is capable of causing pelvic rotation.

Another aspect of the invention relates to a fetal birthing simulator. The fetal birthing simulator comprises a head, a head position sensor, a neck, an enclosed channel, a body position sensor, and a deformable covering. The head position sensor is mounted within the head. The neck is connected to the head and adapted to provide a biofidelic fetal range of motion for the head. The enclosed channel has an interior volume, and a lower portion of the neck is received by the enclosed channel and mounted therein such that the neck is capable of moving between an extended and a retracted position. The body position sensor is mounted within the enclosed channel, and a deformable covering is arranged to cover the fetal birthing simulator.

Yet another aspect of the invention relates to a fetal brachial plexus strain simulator. The simulator comprises a head, a head position sensor, a spinal assembly, a network of interconnected nerve tubing, and a body. The head position sensor is mounted within the head. The spinal assembly is connected to a lower portion of the head. The network of interconnected nerve tubing is connected to the spinal assembly and simulates the location and extent of the brachial plexus nerves in a fetus. The body is connected to a lower portion of the spinal assembly, and the nerve tubing is adapted to contain a substance whose electrical properties change in response to strain.

A further aspect of the invention relates to a method of simulating the behavior of the brachial plexus. The method comprises inserting measurement leads into a network of tubing sized and connected so as to approximate the position, size, and compliance of the nerves of the brachial plexus of a fetus. The network of tubing is filled with a fluid whose electrical properties change in response to applied strain. The method also comprises measuring the change in electrical properties between the measurement leads as strains are applied to the network of tubing.

Other aspects, features, and unique characteristics of the invention are set forth in the description that follows.

BRIEF DESCRIPTION OF THE DRAWINGS

The invention is described with respect to the following drawing figures, in which like numerals represent like views throughout the figures, and in which.

DETAILED DESCRIPTION

Figure 1:
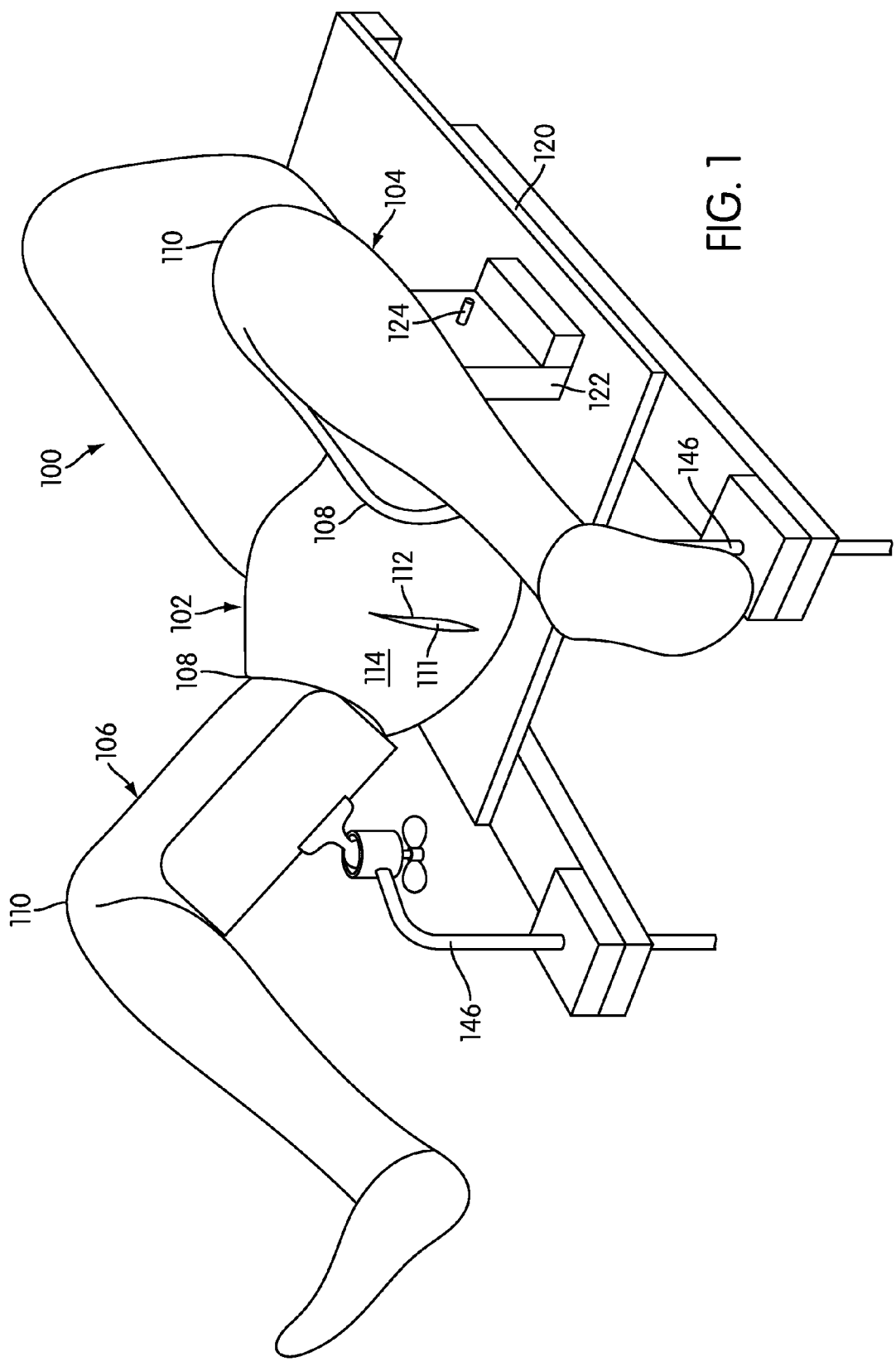
FIG. 1 is a perspective view of a maternal birthing simulator according to one embodiment of the invention.

FIG. 1 is a perspective view of a maternal birthing simulator, generally indicated at 100, according to one embodiment of the invention. The maternal birthing simulator 100 has a pelvis 102 and movable left and right legs 104, 106 attached to the pelvis 102. The left and right legs 104, 106 are articulated at the hip so as to define respective hip joints 108, and are articulated at the knee so as to define respective knee joints 110. In the view of FIG. 1, the left and right legs 104, 106 rest in stirrups 146 in the lithotomy position, flexed at the knee and hip joints 108, 110. The pelvis 102 has a birth canal 111 that terminates in an external opening 112 of a size and shape that simulate the vaginal outlet, although in some embodiments, the pelvis 102 may be fitted with a commercial perineum. The opening 112 is defined in a deformable covering 114, which also covers the pelvis 102 and legs 104, 106. In general, the deformable covering 114 simulates the layers of skin, adipose, and muscle tissue found in human anatomy, and provides the legs 104, 106 and the pelvis 102 with more realistic weight and size.

Figure 2:
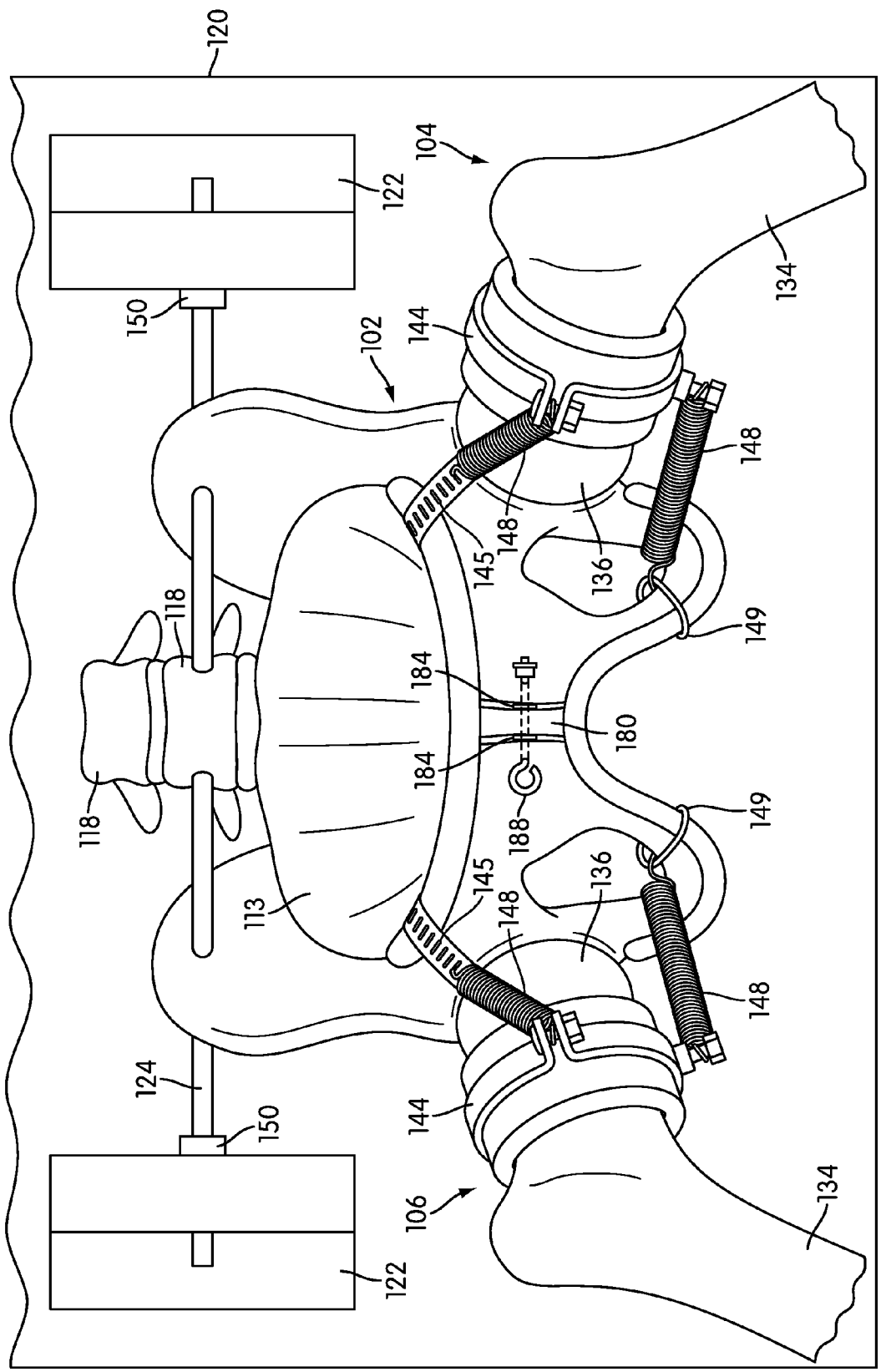
FIG. 2 is a front elevational skeletal view of the birthing simulator of FIG. 1, illustrating the pelvis and legs without a deformable covering.
Figure 3:
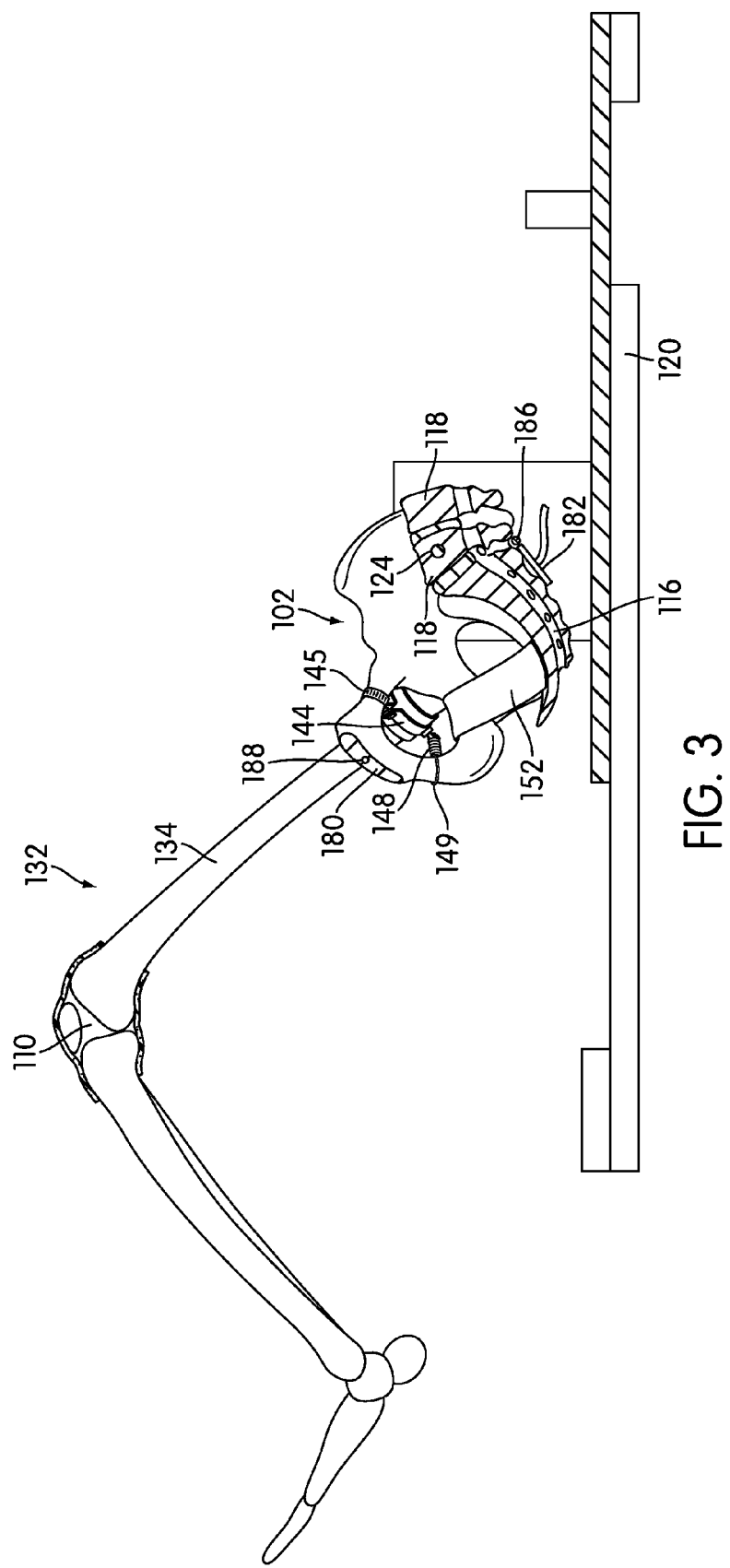
FIG. 3 is a side elevational sectional view of the birthing simulator of FIG. 1 without a deformable covering.

FIG. 2 is a skeletal view of a portion of the maternal birthing simulator 100 illustrating the pelvis 102 and legs 104, 106 without the deformable covering 114. FIG. 3 is a side elevational sectional view of the pelvis 102 and legs 104, 106 without the deformable covering 114. As shown in FIGS. 2 and 3, in the illustrated embodiment, the pelvis 102 of the birthing simulator 100 is an anatomically realistic model of a human gynecoid pelvis, although other types of pelvises, including anthropoid pelvises and any other types of pelvises that are useful to simulate, may be used in other embodiments. Moreover, the pelvis 102 is articulated such that the joints that comprise the pelvis 102 can expand and the sacrum 116 of the pelvis 102 can rotate and flatten slightly. In the illustrated embodiment, the pelvis 102 is also attached to a set of lower lumbar spinal vertebrae, generally indicated at 118, up to the L4 vertebra. However, in other embodiments, the lower lumbar spinal vertebrae 118 need not be included.

An appropriate pelvis having the features described above can be purchased from a number of health education and other companies. For example, Health Edco of Waco, Tex. (United States) sells gynecoid pelvic models that can be modified to have articulated pelvic joints that have been found to be appropriate for embodiments of the present invention. The gynecoid pelvises sold by Health Edco are typically comprised of PVC, and the portions of the pelvis 102 are secured together at the articulated joints with bolts 188. In other embodiments, the pelvis 102 may be made of plastic, composite, or some other material, usually with rubber or another flexible material acting as ligaments to articulate the pelvic joints.

A skeletal pelvis and the associated portion of the spinal column, if any, may be modified as appropriate to add other anatomical features or to increase the biofidelity of the existing features. For example, in the illustrated embodiment, two 1.5 inch wide nylon straps 152 (Safety Central, Ukiah, Calif., United States) are attached to each side of the pelvis 102 to simulate the pelvic ligaments. (One of the straps 152 is visible in the view of FIG. 3.) In order to allow for additional expansion, the bolts 188 at the pelvic articulated joints were loosened and spacers 184 were inserted at the joints. The spacers may, for example, be washers, nuts, or pieces of a suitable rubber (e.g., neoprene rubber) that are sized to fit over the bolts 188. Up to five washers or nuts may be used as spacers 184 at the pelvic joints. FIG. 2 illustrates two spacers 184, one on each side of the symphysis pubis 180 of the pelvis 102. Other joints of the pelvis 102 may be provided with spacers in a similar manner.

Additionally, in order to allow for more biofidelic flattening of the sacrum, a hinge extends 186 between the L5 and S1 vertebrae.

As shown in FIGS. 1-3, the maternal birthing simulator 102 is supported by a base 120, which, in the illustrated embodiment, comprises a set of appropriately shaped and sized boards. Rising vertically from the base 120 are two lateral supports 122. A shaft 124 is rotatably mounted between the lateral supports 122. The shaft 124 passes through the pelvis 102 and one of the lumbar vertebra 118, and is secured to the pelvis 102 and the lateral supports 122 using shaft collars 150. Although many different types of shafts 124 are suitable, the shaft 124 may be, for example, a 5/16-inch stainless steel rod. The holes in the pelvis 102 and the vertebra 118 may be originally formed in those components during the molding or fabrication process, or they may be machined into the components in appropriate locations. In order to avoid misalignment, it may be particularly advantageous to use a horizontal drill press to make well-aligned set of passages, rather than drilling each opening separately. As mounted on the shaft 124, and with the legs 104, 106 connected in a manner that will be described below, the pelvis 102 is capable of approximately 30° of cephalad rotation.

In other embodiments, the pelvis 102 and shaft 124 may be connected by other means. For example, an adhesive, such as a silicone sealant, may be used to fix the pelvis 102 to the shaft 124. The pelvis 102 and shaft 124 may also be fixed together by fasteners, such as screws or bolts. In some embodiments, a pelvis may be made with an integral shaft-structure that is adapted to be rotatably mounted on the lateral supports 122.

However, in other embodiments, a shaft 124 or shaft structure that traverses the width of the pelvis 102 and passes through a vertebra 118 may not be necessary. For example, each of the two lateral supports 122 could be provided with a relatively shorter shaft that extends inwardly, toward the pelvis 102, is attached to the pelvis 102 on one side (for example, on the lateral, outwardly-facing side of the iliac crest) and terminates there. In such an arrangement, no shaft 124 would extend between the two iliac crests of the pelvis, and no shaft 124 would pass through a vertebra 118. In that case, it may be desirable to fix one or more of the vertebrae 118, for example, the L5 vertebra, to the base 120 by bolting or otherwise securing them. Any mounting mechanism that provides a suitable, generally horizontal, biofidelic axis of rotation is suitable for use in simulators according to embodiments of the invention.

As shown in FIGS. 1-3, the left and right legs 104, 106 are comprised of anatomically realistic human skeletal legs 132 covered by appropriate layers of material that define the deformable covering 114. In the illustrated embodiment, the femurs 134 of the skeletal legs 132 are secured to the pelvis 102 by securing a split ring 144 to each of the femurs 134, securing a modified hose clamp band 145 around the acetabular area of the pelvis 102, and connecting the two using tension coil springs 148. Additional tension coil springs 148 are connected between the split ring 144 and attachment rings 149 secured to the pelvis 102 around the inferior pubic rami. This arrangement provides for realistic abduction and adduction of the legs 104, 106. Other types of elastic members, such as lengths of rubber having appropriate properties and shapes, may be used in other embodiments.

In other embodiments, the femurs 134 may be wired into the appropriate sockets of the pelvis 102 or otherwise attached so as to be movable. If the skeletal legs 132 are made using slightly different dimensions than the pelvis 102 (e.g., due to manufacturing error or differences among manufactured lots), the femoral heads 136 may be ground down slightly or otherwise altered to fit. Additionally, if the femoral heads 136 differ in size, it may be advantageous or necessary to attach them in different ways. For example, one femoral head 136 could be wired to the pelvis 102 and the other could be attached by a bolt (not shown) placed through the pelvic socket 138 and femur 134 perpendicular to the axis of movement.

The particular method of attachment of the pelvis 102 and skeletal legs 132 is not critical as long as the legs have a reasonably biofidelic range of motion and are attached in such a way that cephalad movement of the legs 104, 106 translates into rotational movement of the pelvis 102.

Once the legs 104, 106 are attached to the pelvis 102, it is possible that their weight may disturb the equilibrium resting point of the pelvis 102. Therefore, in some embodiments, fasteners may be inserted from the pelvis 102 into the femurs 134 to maintain the lithotomy position as the resting position of the legs 104, 106.

Full skeletal legs including knees, lower leg portions, and feet are advantageous in that they provide a more biofidelic experience and more accurately simulate, for example, the amount of pelvic rotation that can be expected in response to a cephalad movement of the legs 104, 106. However, in some embodiments, particularly when a more compact and portable maternal simulator is desired, it may be desirable to truncate the legs at mid-thigh. The overall "look" of such a simulator can be appreciated from FIGS. 2 and 11-13.

Figure 4:
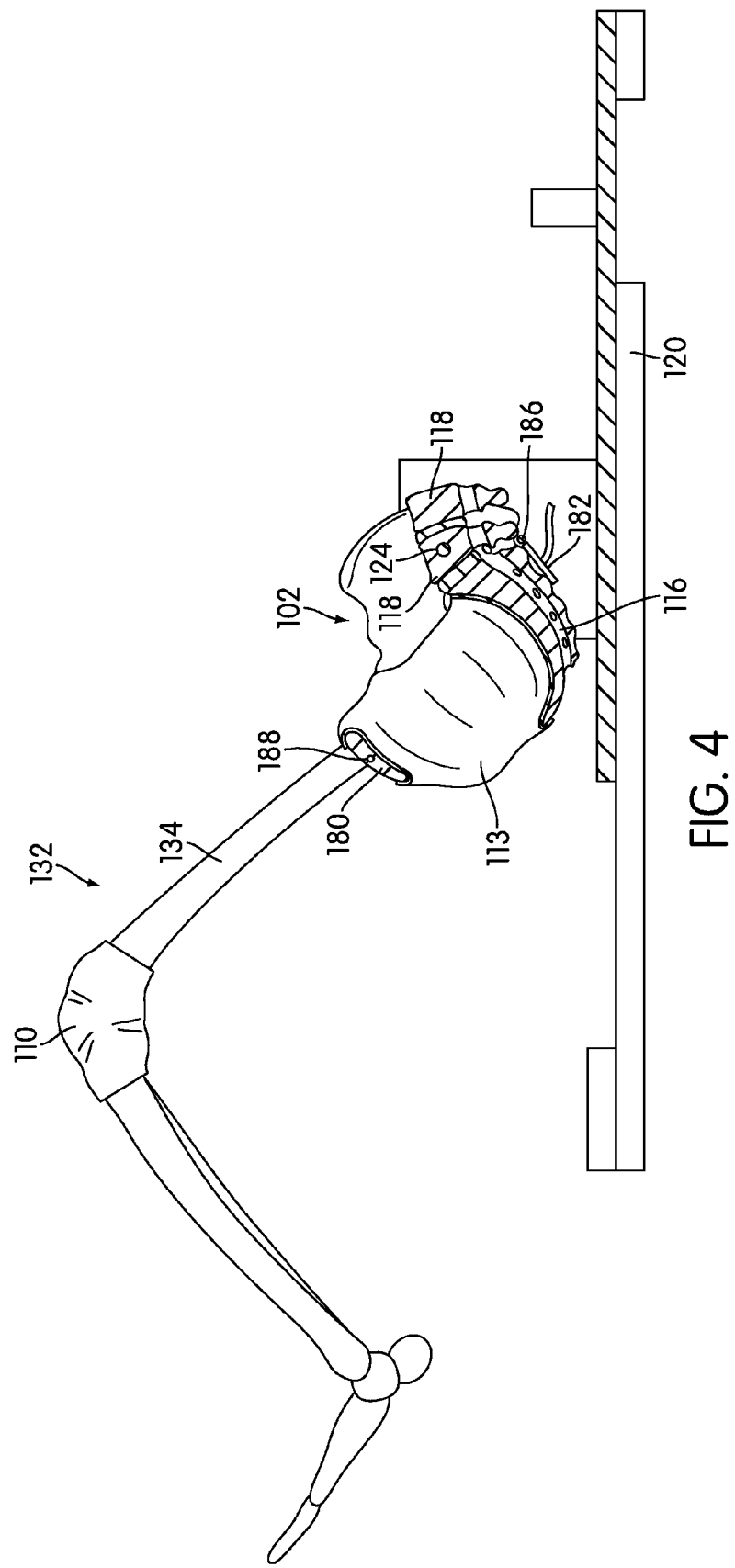
FIGS. 4 and 5 are side elevational sectional views of the birthing simulator similar to the view of FIG. 3, illustrating the addition of various layers of deformable covering to the birthing simulator, as well as the ultimate interior arrangement of the birthing simulator.
Figure 5:
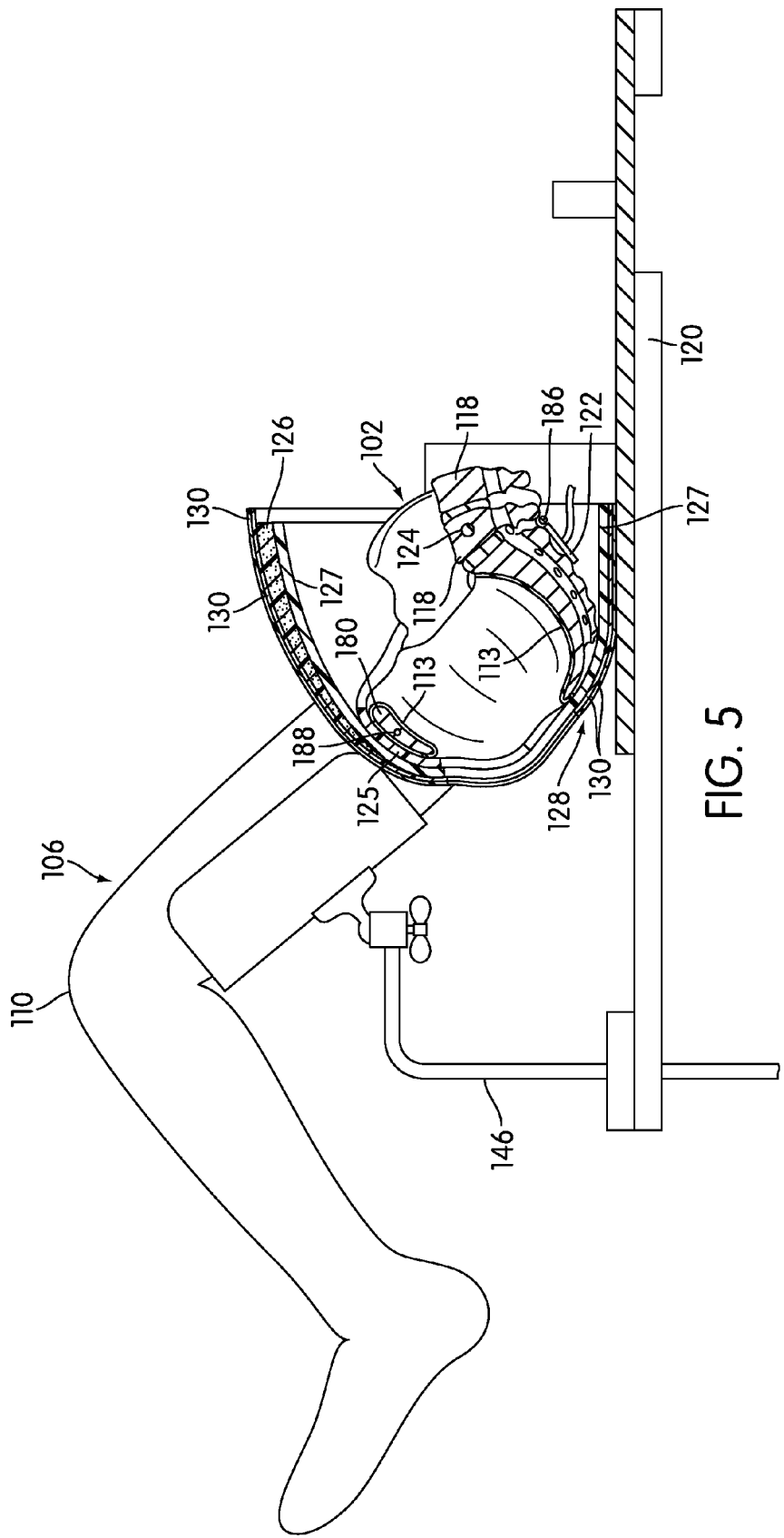

As was described above, the pelvis 102 and legs 104, 106 are covered by a deformable covering 114. The deformable covering 114 may include one or more layers of material. Where more than one layer of material is included, the layers need not be of the same type or have the same mechanical properties. FIGS. 4 and 5 are side elevational sectional views of the birthing simulator similar to the view of FIG. 3, illustrating, in an inward-to-outward sequence, the addition of the various layers of material that comprise the deformable covering 114 on the parts of the maternal birthing simulator 100.

Among the layers of material on the birthing simulator 100 is a lining 113 placed within and fixed to the pelvis 102 so as to cover the birth canal. This lining 113 is best seen in FIG. 2. The lining 113 of the birth canal 111 may vary from embodiment to embodiment, depending on the degree of biofidelity desired and the type of application or simulation. Electrical tape, about 1/16" thick, has been found to be one suitable material, because it accurately simulates the feel of the soft tissues in the birth canal 111. Other linings may be secured with adhesives, for example, cyanoacrylate adhesives, epoxies, or by any other suitable method.

In most embodiments, an electrical tape lining 113 for the birth canal 111 may be fully suitable. However, in other embodiments, it may be advantageous to select other materials. For example, although the maternal birthing simulator 100 is generally sufficiently biofidelic without the use of fluids, if fluid use is desired, the outermost portion of the lining 113 of the birth canal 111 should be compatible with fluids. In some embodiments, thin plastic sheeting has been found to be particularly suitable as an outermost layer of the lining 113 of the birth canal 111. For example, SARAN WRAP thin plastic sheeting is readily available and has an appropriate coefficient of friction. Pleather (simulated leather) material has also been used for the lining 113, but has been found to have an undesirably high coefficient of friction for most applications. Another suitable material for the lining 113 is neoprene rubber 1/16th or 1/8th of an inch thick, optionally covered with an adhesive tape, such as duct tape, to conform it to the proper shape and provide a biofidelic coefficient of friction.

Defining the contours of the maternal birthing simulator 100 from the pelvis 102 out are a number of layers of deformable materials. These layers are best seen in FIG. 5. There may be any number of layers of deformable materials within the maternal birthing simulator 100. Generally, the innermost layers of material are soft, relatively thin, and conforming, like the lining 113 of the birth canal 111, such that they are suitable for direct fixation to the skeleton of the pelvis 102. As the distance from the pelvis 102 increases, the layers of deformable material may conform less to the pelvis 102 and may have more rigidity, so as to define abdominal contours.

For example, FIG. 5 illustrates the lining 113 of the birth canal 111 adhered to the pelvis 102. On the ventral side of the pelvis 102 beyond the lining material 113 is a first additional layer of conforming foam 125. The first additional layer of foam 125 may, for example, be a relatively thin layer of polyurethane foam. Both the lining 113 and the first additional layer of conforming foam 125 do not extend far beyond the pelvis 102. However, beyond the first additional layer 125 are two additional layers 127 and 126 that are slightly more rigid and extend farther than the pelvis 126 to define the abdominal contours. Two layers of pleather 130 define the outermost layer.

On the dorsal side of the pelvis 102, there are also layers of compressible material. The slope of the dorsal side of the pelvis 102 establishes simulated buttocks 128. However, the padding on the dorsal side of the pelvis 102 may be less than that on the ventral side. In FIG. 5, one layer of deformable material 127 and two layers of pleather 130 are provided to serve as simulated skin.

The particular materials that are used as layers of deformable material 125, 126, 127 are not critical as long as the maternal birthing simulator 100 has a reasonably biofidelic feel when palpated. Layers of inch-thick polyurethane carpet foam and foam sealant have been found to be suitable. Packed cotton balls can also be used, especially for portions of the abdomen, and confer a particular texture to the resulting simulated tissue. Adhesive tape or other types of wrapping may be used to create interstitial layers that conform the deformable materials to particular shapes and help the layers 125, 126, 127 to adhere. Additionally, latex or another type of rubber or plastic may be used for the simulated skin 130 of the maternal birthing simulator. In some embodiments, a single block of foam or another deformable material having the appropriate overall shape and biofidelic mechanical properties may be formed, rather than conforming individual layers to appropriate shapes. In other embodiments, the deformable covering 114 could be formed of two general layers: one layer of sponge or foam rubber that provides the feel of the internal organs, and one layer that provides the feel of the skin.

Figure 6:
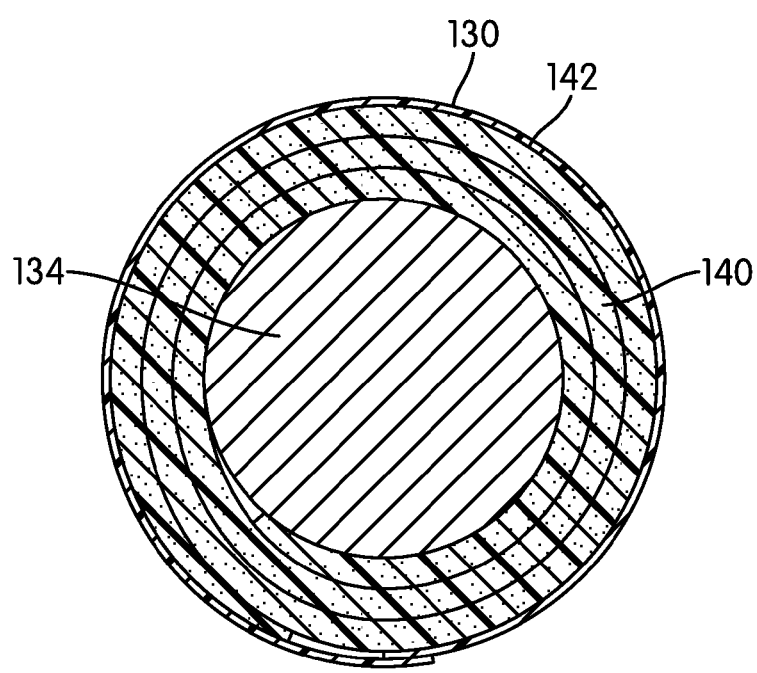
FIG. 6 is a cross-sectional view of one of the legs of the birthing simulator of FIG. 1 taken through the mid-thigh, illustrating the interior arrangement of the leg.

The left and right legs 104, 106 also include layers of deformable materials to give them appropriate thickness and characteristics. Layers of rigid or semi-rigid materials may also be added to give the legs 104, 106 a more defined shape. FIG. 6 is a cross-sectional view of one of the legs 104, 106 taken at the mid-thigh, illustrating the layers that form the deformable covering 114 of the legs 104, 106. As shown in FIG. 4, the femur 134 is at the center of the leg 104, 106. The femur 134 of the illustrated embodiment is surrounded by relatively thick and dense layers of polyurethane foam 140 of the type typically used to pad carpets. Surrounding the dense polyurethane foam 140 is a relatively rigid layer 142. Surrounding the relatively rigid layer 142 is a layer of less dense polyurethane foam 126, on top of which are layers of pleather, which act as simulated skin. In the illustrated embodiment, the relatively rigid layer 142 comprises a layer of papier mâché, although other materials, such as plastics, may be used.

As was noted above, the particular layers and materials that are used to construct the deformable covering 114 of the pelvis 102 and legs 104, 106 are not critical. However, it is advantageous if the legs mimic the type of layering found in the human body. The construction of the legs 104, 106 generally mimics the arrangement of human legs: bone, surrounded by relatively dense muscle, surrounded by fasciae and a less dense and more pliable layer of adipose tissue and skin.

With the pelvis 102 and legs 104, 106 described above, a fetal simulator could be manually inserted into the birth canal 111 from the rear of the pelvis 102 and manual force could be applied from the rear to cause the fetal simulator to crown through the external opening 112.

However, in some embodiments, maternal simulator 100 may also include a uterine propulsive system that simulates the function of the uterus and provides at least some propulsive force to a fetal simulator positioned within the birthing simulator 100. One embodiment of a uterine propulsive system 158 is illustrated in FIG. 7, a sectional side elevational view similar to the views of FIGS. 3-5.

Figure 7:
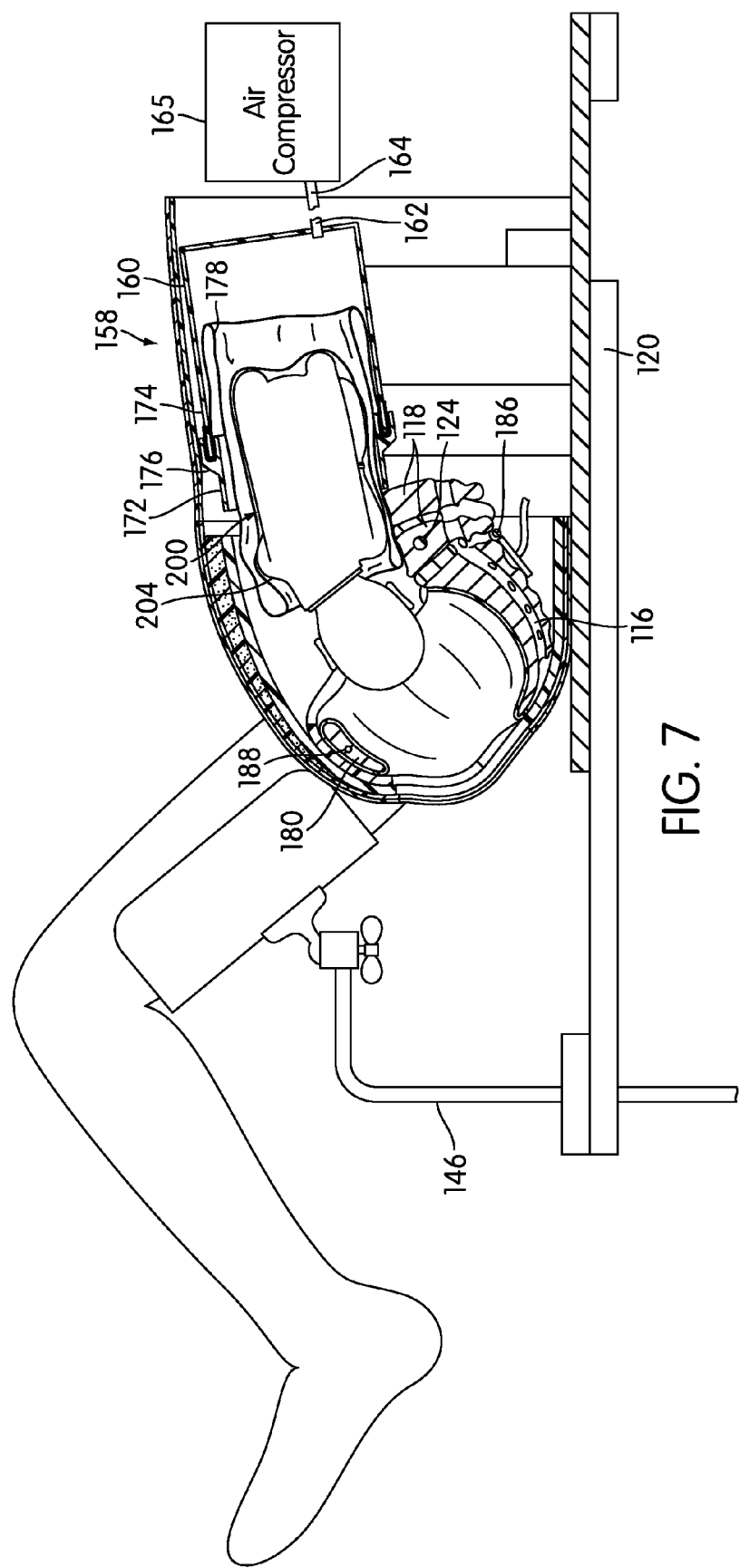
FIG. 7 is a side elevational sectional view of the birthing simulator, similar to the view of FIG. 5, illustrating the birthing simulator with a uterine propulsive system and a fetal birthing simulator.

As is shown in FIG. 7, the uterine propulsive system 158 comprises a pressure chamber 160 with a valve 162. The valve 162 connects by a hose 164 to an external air compressor or another source of pressurized gas 165. The valve 162 is most advantageously a pinch valve that can be manually pinched when flow cutoff is desired. However, another type of valve, such as a ball valve, may be used.

The pressure chamber 160 itself is comprised of two tightly fitting portions, an inner portion 172 and an outer portion 174. The inner portion 172 is inserted into the outer portion 174 so as to make an airtight seal. Silicone sealant, a gasket, or another type of sealing member may be used, particularly on the forward edge of the interface, to create an airtight seal between the inner and outer portions 172, 174. External cantilever clasps 176 arranged about the periphery of the seal between the inner portion 172 and the outer portion 174 maintain the seal by exerting compressive force on it.

The pressure chamber 160 is connected to an inflatable vessel 178 that is in fluid communication with the pressure source 165 and the valve 162 such that it inflates and deflates in response to pressure changes within the pressure chamber 160. The edge of the inflatable vessel 178 is sandwiched between the inner and outer portions 172, 174 of the pressure chamber at their airtight interface. In the illustrated embodiment, the inflatable vessel 178 is a generally conically shaped bag that, when inflated, pushes into the birth canal 111 to surround and exert pressure on a fetal simulator positioned within the birth canal 111.

In one embodiment, the pressure chamber 160 may be comprised of sections of a generally cylindrical plastic bucket, sectioned appropriately to make inner and outer portions 172, 174 and provided with sealant or a sealing member, such as a gasket, to make an airtight seal between the two portions 172, 174. In other embodiments, it may be advantageous to use a rectangular pressure chamber, rather than a cylindrical one, because rectangular pressure chambers can be supported more easily on a flat surface.

The uterine propulsive system 158 described above has the ability to produce about 8 pounds per square inch (psi) of expulsive force. Once the simulation has been completed, air may be bled from the pressure chamber 160 through the valve 162, or through a separate pressure relief valve. The pressure source 165 used for simulations may be, for example, a 150 HP, 2 gallon, 150 psi compressor (Craftsman, Hoffmann Estates, Ill., United States).

Depending on the embodiment, the uterine propulsive system 158 may be operatively connected to the birth canal 111 of the pelvis in a variety of ways. In the arrangement shown in FIG. 7, the uterine propulsive system 158 is externally supported and is placed proximate to the maternal birthing simulator 100 so that the inflatable vessel 178 can inflate and fill the pelvis 102 to exert delivery pressure on a fetal birthing simulator within the birth canal 111.

However, in other embodiments, the pressure chamber 160 may be adapted to make a physical connection with the pelvis 102. For example, a generally annular keyhole receiver plate could be secured to the base 120 such that its opening aligns with the birth canal 111 in the pelvis 102. The keyhole receiver plate would include a number of evenly spaced keyhole slots that would be engaged by a corresponding number of key projections on the forward lip of the pressure chamber 160.

The maternal birthing simulator 100, particularly when coupled with an appropriate fetal simulator, can be used to simulate many different types of complicated births and the internal and external maneuvers used to address those complications. Examples of complications that may be simulated include positional complications such as shoulder dystocia, breech birth, and transverse lie. Operative vaginal delivery can also be simulated.

In the view of FIG. 7, a fetal birthing simulator 200 is present within the maternal birthing simulator 111. The initial position of the fetal simulator within the maternal birthing simulator 100 determines whether an uncomplicated birth, shoulder dystocia, breech birth, or another type of mechanically complicated birth will occur.

Figure 8:
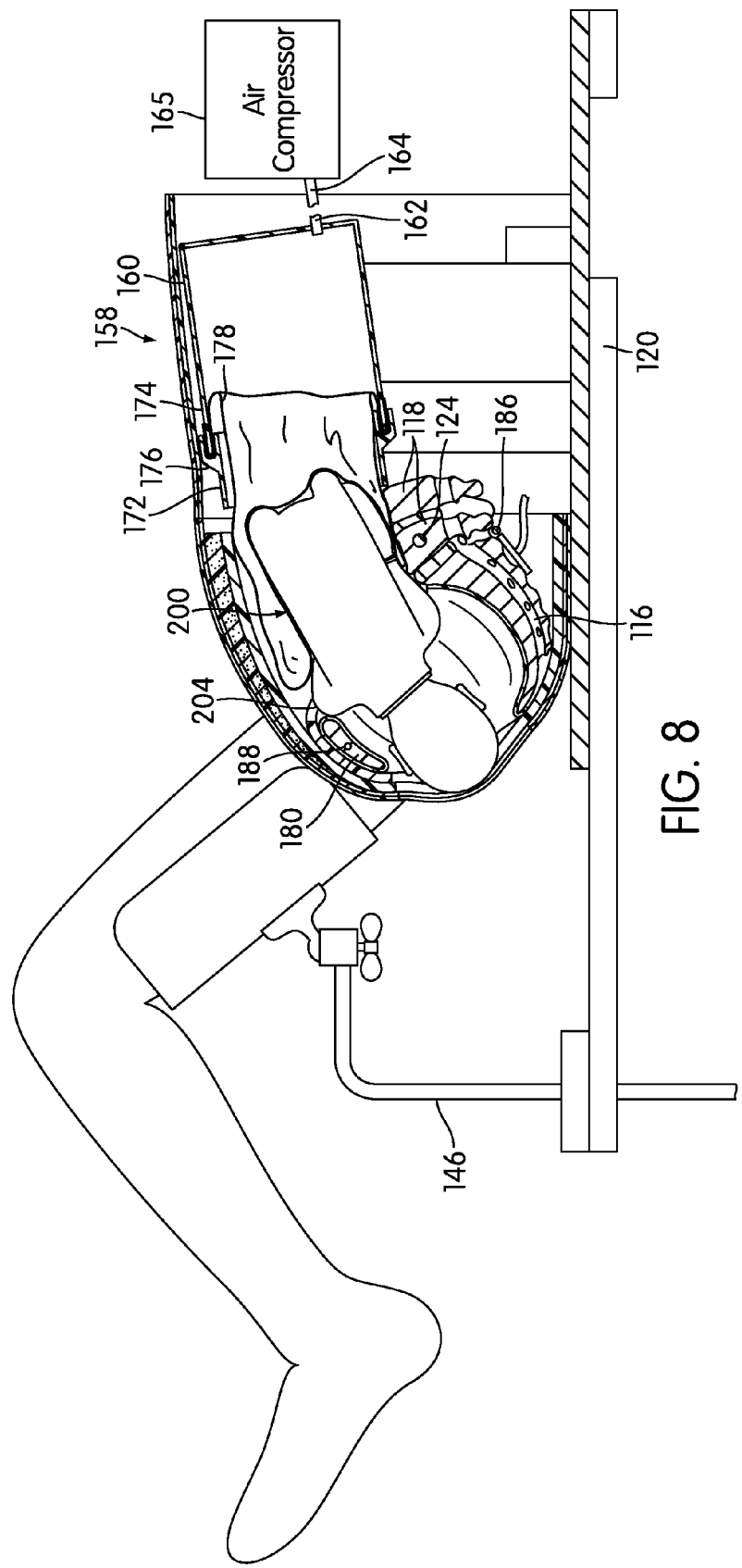
FIG. 8 is a side elevational sectional view, similar to the view of FIG. 7, illustrating the fetal birthing simulator in shoulder dystocia.

As one example of the types of conditions and maneuvers that may be simulated, FIG. 8 is a side elevational sectional view of the maternal birthing simulator 100 with the fetal birthing simulator 200, illustrating the condition of shoulder dystocia. In the position of FIG. 8, the fetal simulator 200 has crowned, but the anterior (right) fetal shoulder 204 is lodged against the symphysis pubis 180 of the pelvis 102. As was described above, although the position illustrated in FIG. 8 could be created by positioning the fetal simulator 200 manually, FIG. 8 also illustrates the uterine propulsive system 158 in use with the inflatable vessel 178 inflated and exerting pressure against the fetal simulator 200.

There are a number of obstetric maneuvers that can be used to address shoulder dystocia, and many of those maneuvers may be simulated using the combination of maternal birthing simulator 100 and fetal simulator 200. Examples of maneuvers include the McRoberts Maneuver, suprapubic pressure, Rubin's Maneuvers, and Posterior Arm Delivery.

Figure 9:
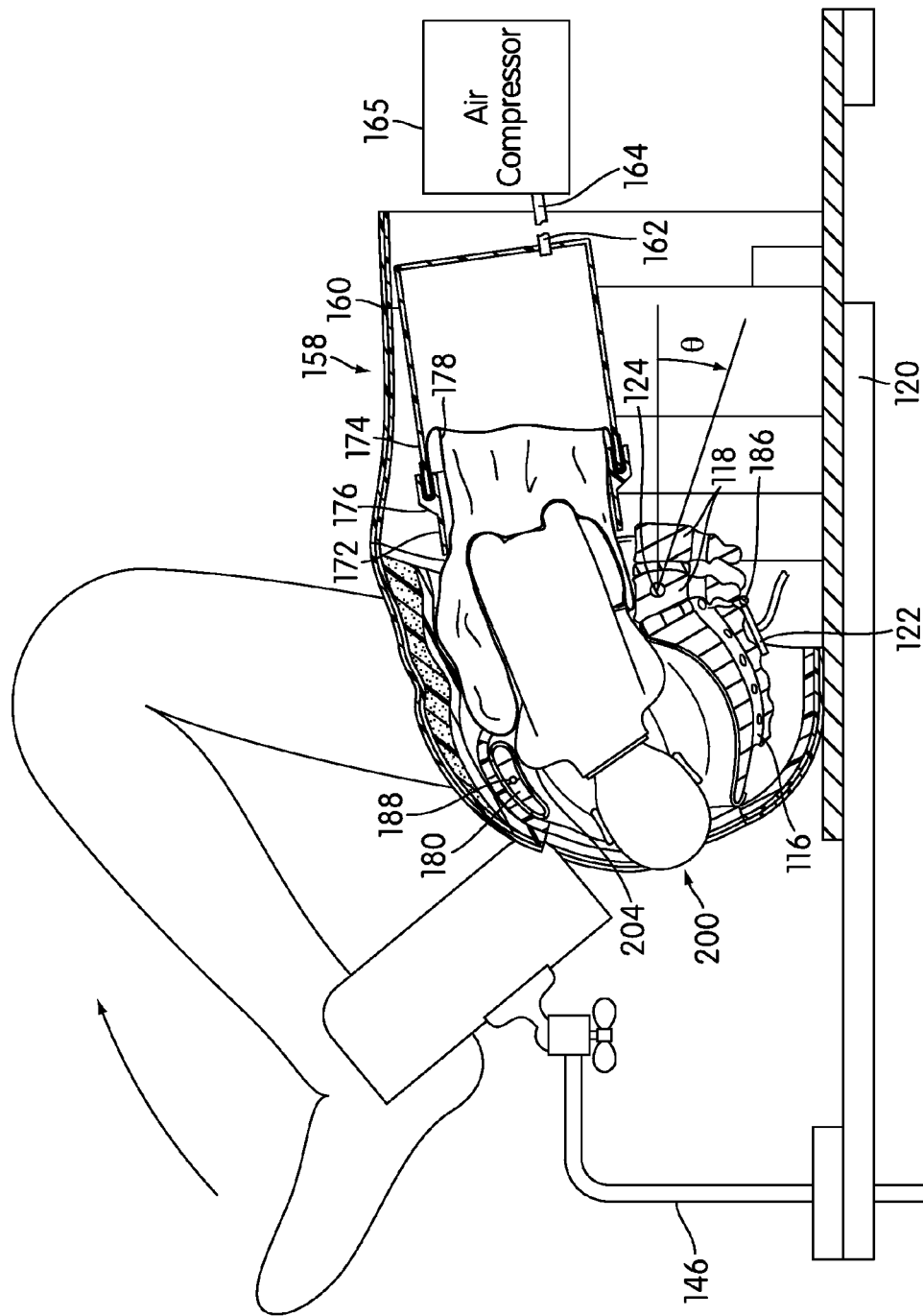
FIG. 9 is a side elevational sectional view, similar to the view of FIG. 8, illustrating the performance of the McRoberts Maneuver.

FIG. 9 illustrates the McRoberts Maneuver. As shown, the legs 104, 106 are hyperflexed at the knee and hip joints 108, 110 and forced to move cephalad, causing the pelvis 102 to rotate as the legs 104, 106 are moved. Once in the McRoberts position, the legs 104, 106 may optionally be secured in position by use of the stirrups 146. The 30° of cephalad rotation of which the pelvis 102 is capable is greater than the 16-20° of cephalad rotation typically seen during the performance of the McRoberts Maneuver. The rotation of the pelvis 102 moves the symphysis pubis 180 into a different orientation, freeing the anterior fetal shoulder 204 for delivery.

Figure 10:
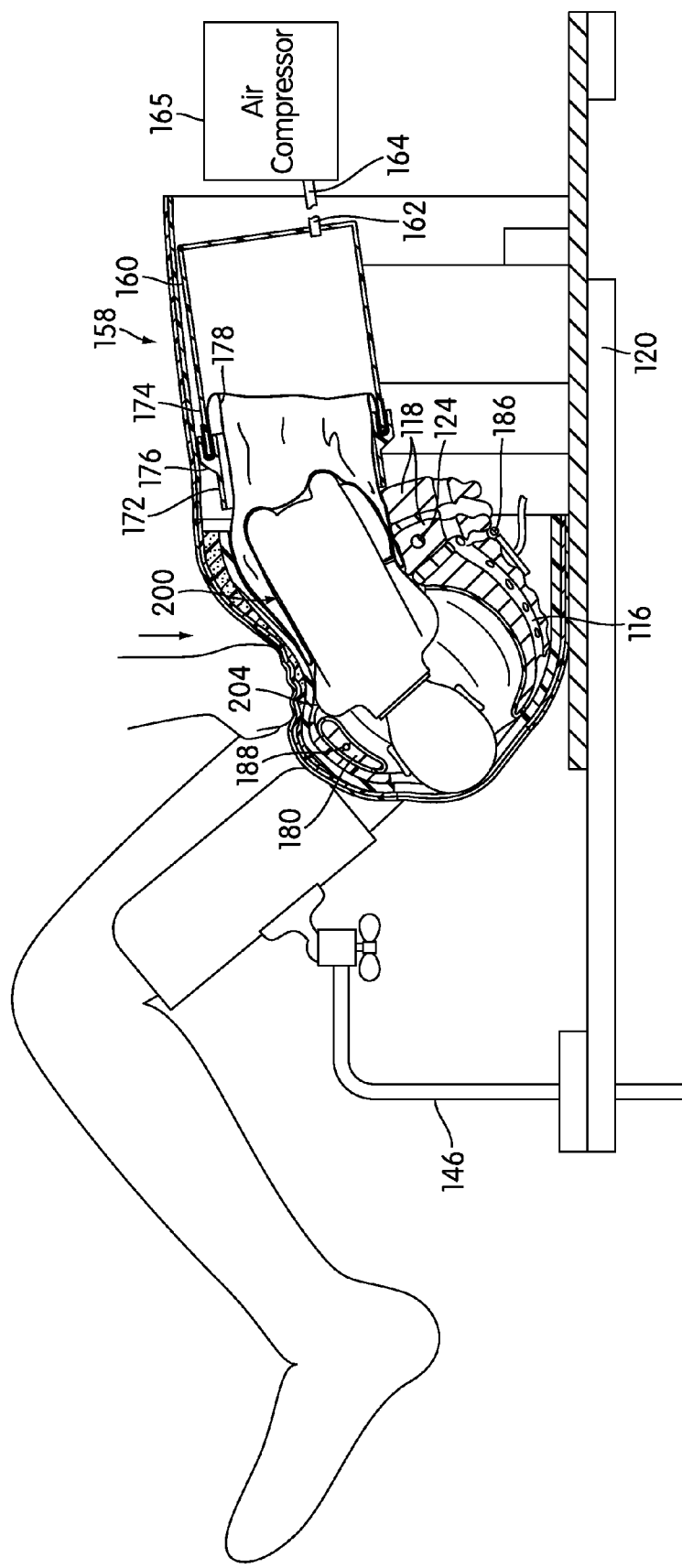
FIG. 10 is a side elevational sectional view, similar to the view of FIG. 8, illustrating the application of suprapubic pressure.

FIG. 10 illustrates suprapubic pressure, in which an assistant applies pressure externally to the pubic region of the pelvis 102 in an attempt to resolve the shoulder dystocia. During the application of suprapubic pressure, the deformable covering 114 over the pelvis 102 provides a generally biofidelic level of resistance.

The McRoberts Maneuver and suprapubic pressure rely largely on external manipulation of the maternal birthing simulator 100. However, because the maternal birthing simulator 100 has a realistic pelvis, it is also possible to simulate some internal and partially internal maneuvers using the maternal birthing simulator 100.

Figure 11:
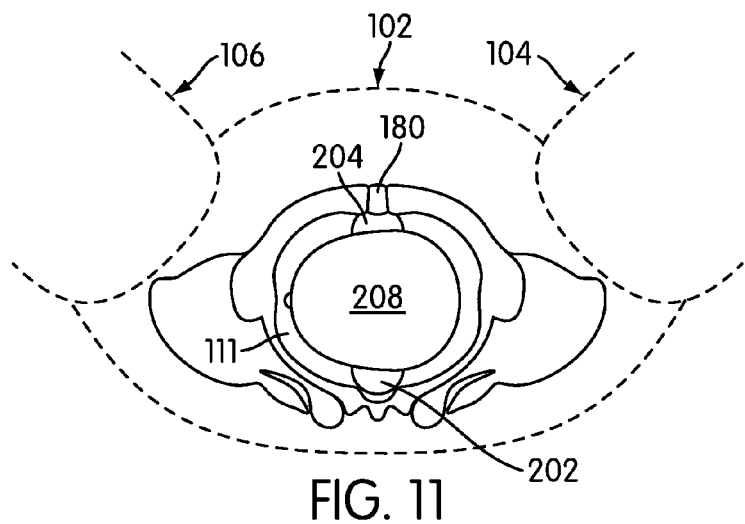
FIG. 11 is a schematic front elevational view of the fetal model with its shoulder vertical, simulating shoulder dystocia.
Figure 12:
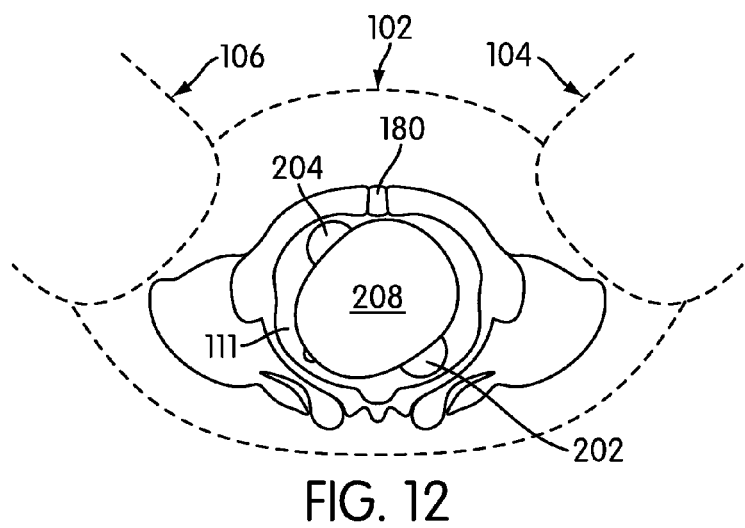
FIGS. 12-13 are schematic front elevational views of the birthing simulator of FIG. 1, illustrating the effect of the performance of Rubin's Maneuvers.
Figure 13:
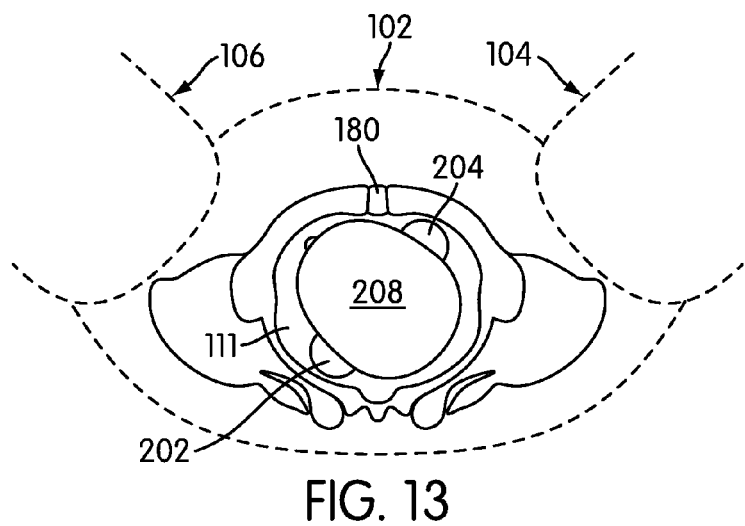

As an example of internal maneuvers that may be simulated using the maternal birthing simulator 100, FIGS. 11, 12, and 13 illustrate Rubin's Maneuvers. FIG. 11 is a schematic front elevational view of the maternal birthing simulator 100 with the fetal simulator 200 crowning with the right shoulder 204 anterior (impacted on the symphysis pubis) to simulate shoulder dystocia. Specifically, the fetal shoulders 204, 206 are aligned and obstructed in the anteroposterior diameter of the pelvis 102. FIG. 12 illustrates the anterior Rubin's Maneuver, in which the anterior shoulder of the fetal simulator 200 has been rotated counterclockwise about 30° so as to fit through the larger oblique diameter of the pelvis 102. FIG. 13 illustrates the posterior Rubin's Maneuver, in which the fetal simulator is rotated about 30° in the opposite direction so as to fit through the oblique diameter of the pelvis 102.

Depending on the particular embodiment, the maternal birthing simulator 100 may have some or all of the features described above, and may be used to simulate some or all of the conditions described above. For example, as was noted above, the maternal birthing simulator 100 may or may not be provided with a uterine propulsive system 158.

In some embodiments, it may be advantageous to provide the maternal birthing simulator 100 with sensors to provide information or feedback on the condition of the simulator 100 and the performance of the user during use. The types of sensors that are used will depend on the type of data that is to be gathered, as well as the desired accuracy of the measurement.

Those of skill in the art will realize that a number of sensors may be incorporated into the maternal birthing simulator 100, including, for example, load cells in the pubic region to measure the force applied during suprapubic pressure, pressure sensors to measure the pressure in the pressure chamber 160, and potentiometers and angular position sensors to measure the position of the pelvis and legs. Of these possible types of sensors, a rotary potentiometer coupled to the pelvic shaft 124 to measure the angle of pelvic rotation and a differential pressure sensor on the pressure chamber 160 have been found to be helpful in some embodiments, particularly when the maternal birthing simulator 100 is to be used for research.

The orientation of the pelvis 102 can also be measured using a uniaxial accelerometer 182 positioned, as shown in FIG. 5, on the sacral median crest. The ADXL105 accelerometer manufactured by Analog Devices of Norwood, Mass. (United States) has been found to be suitable. Acceleration data provided by the sensor can be converted into positional data in a conventional manner.

The process of using sensors and data acquisition systems with the maternal birthing simulator is described in more detail below.

Figure 14:
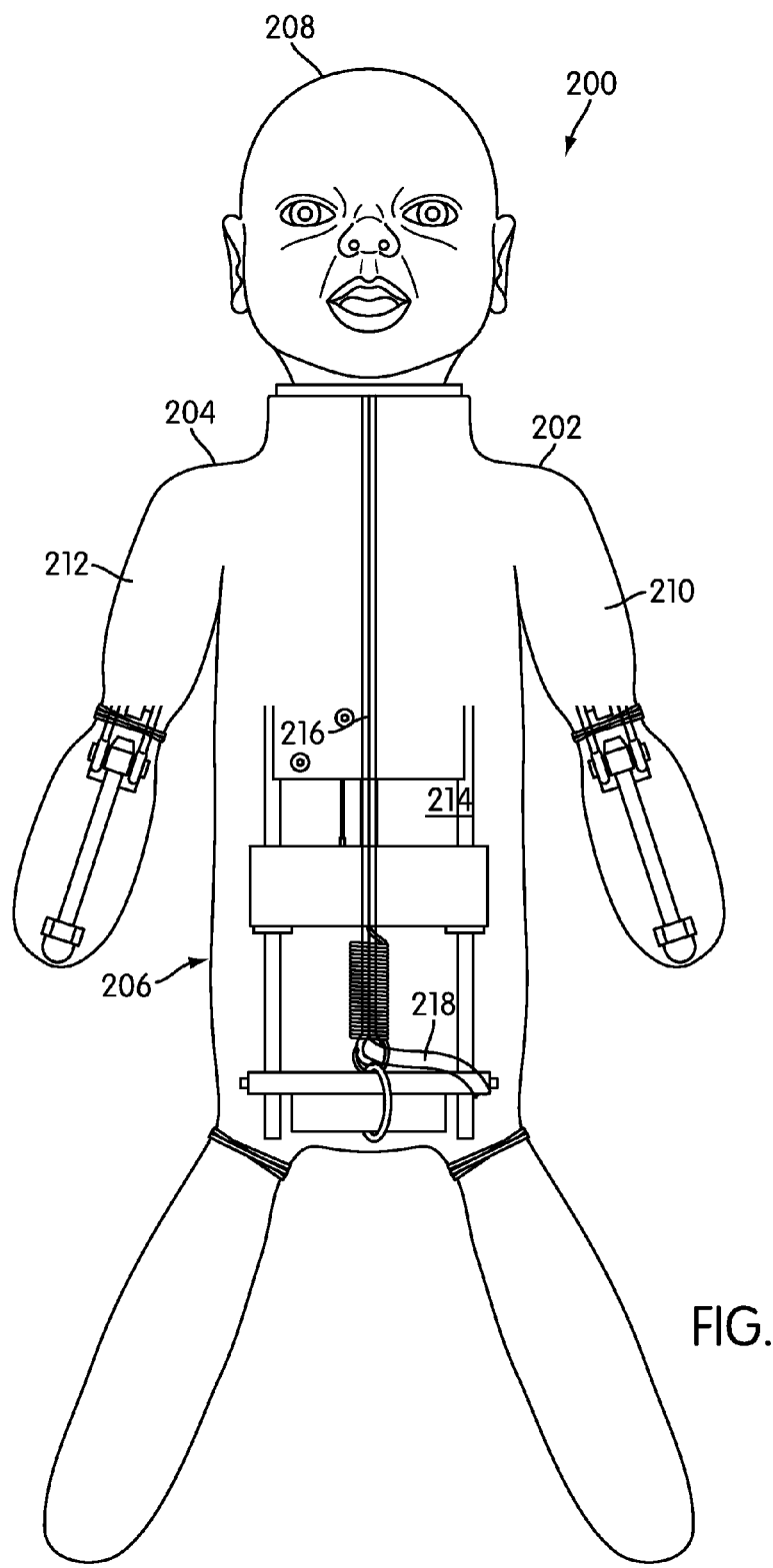
FIG. 14 is a front elevational view of a fetal birthing simulator according to another embodiment of the invention.

FIG. 14 is a front elevational view of a fetal birthing simulator, generally indicated at 200, according to one embodiment of the invention. As shown in FIG. 14, fetal birthing simulator 200 includes a body 206. A head 208 is movably connected to the body 206 in a manner that will be described in more detail below. Left and right arms 210, 212 are connected to the body in such a manner as to define movable left and right shoulders 202, 204 that are adapted to facilitate flexion and extension of the left and right arms in several planes of motion.

The fetal birthing simulator 200 is sized to fit through the pelvis 102, birth canal 111, and external opening 112 of the maternal birthing simulator 100 so as to enable simulated deliveries to be performed. Therefore, if the pelvis 102 and associated components of the maternal birthing simulator 100 are life-size, the fetal birthing simulator 200 would typically have the size, weight and anthropomorphic features of a correspondingly-sized, full-term fetus. However, in other embodiments, the fetal birthing simulator 200 may be sized differently. For example, some embodiments of the fetal birthing simulator 200 may be sized so as to simulate a fetus that is not full-term. Other embodiments of the fetal birthing simulator 200 may be sized, weighted, and given other characteristics so as to simulate a particular condition or type of condition. A particular example of this in the illustrated embodiment of the fetal birthing simulator 200 is described below.

The body 206 has an outer covering 214 that, in the illustrated embodiment, is removable to facilitate access to the components within the body 206. A zipper 216 allows removal of the outer covering 214. Protruding through the outer covering 214 in the position of a fetal umbilicus is a cable 218 that is used to convey the readings of sensors within the body 206 to an external data acquisition system (not shown in the figure). The volume under the outer covering 214 is filled with a soft, compressible material.

In the illustrated embodiment, the outer covering 214 is made of nylon mesh, and is stuffed with foam and polyester fiberfill. In other embodiments, the outer covering 214 could be formed of and filled with any appropriate materials.

Figure 15:
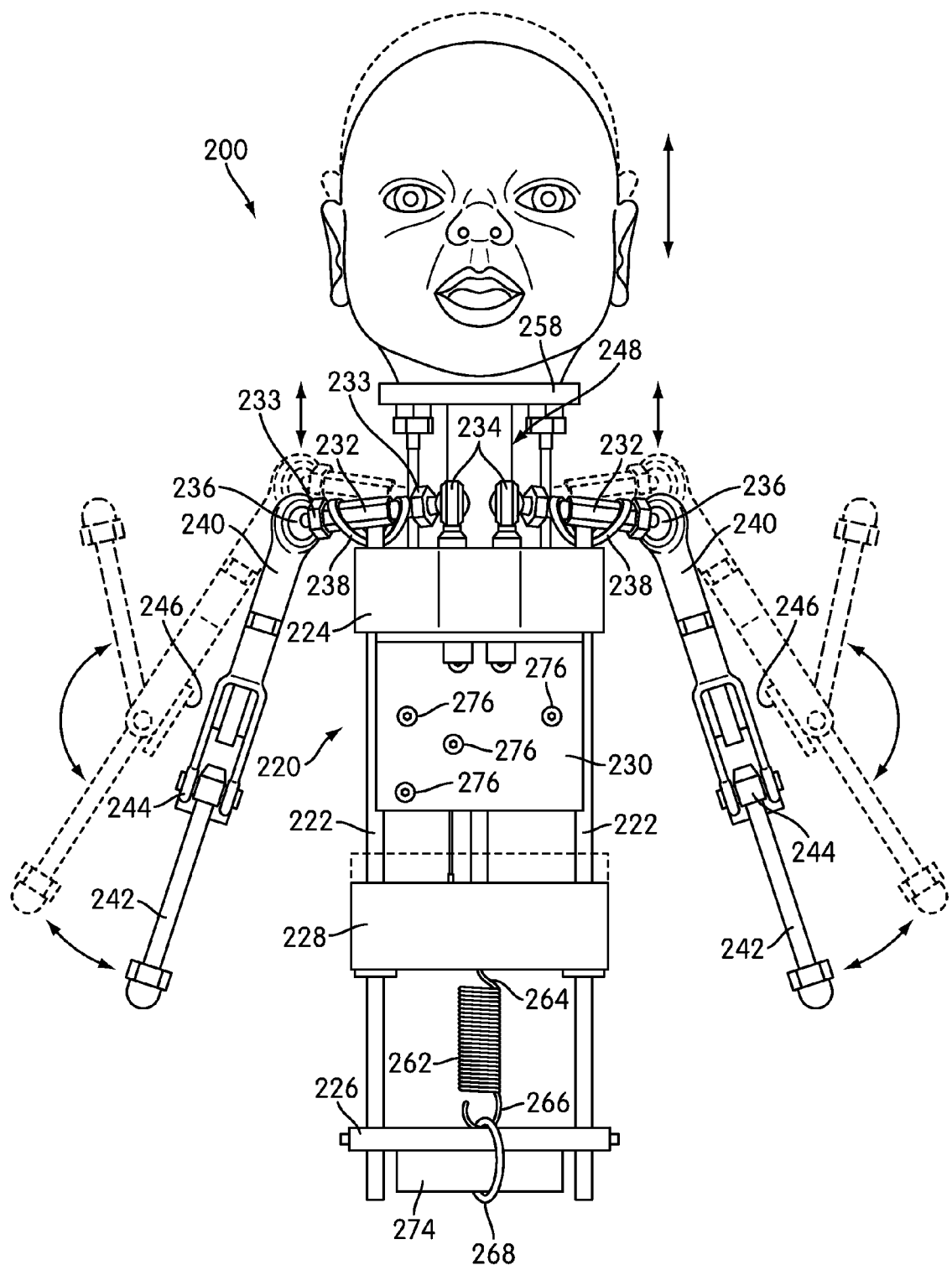
FIG. 15 is a front skeletal view of the fetal birthing simulator of FIG. 14.
Figure 16:
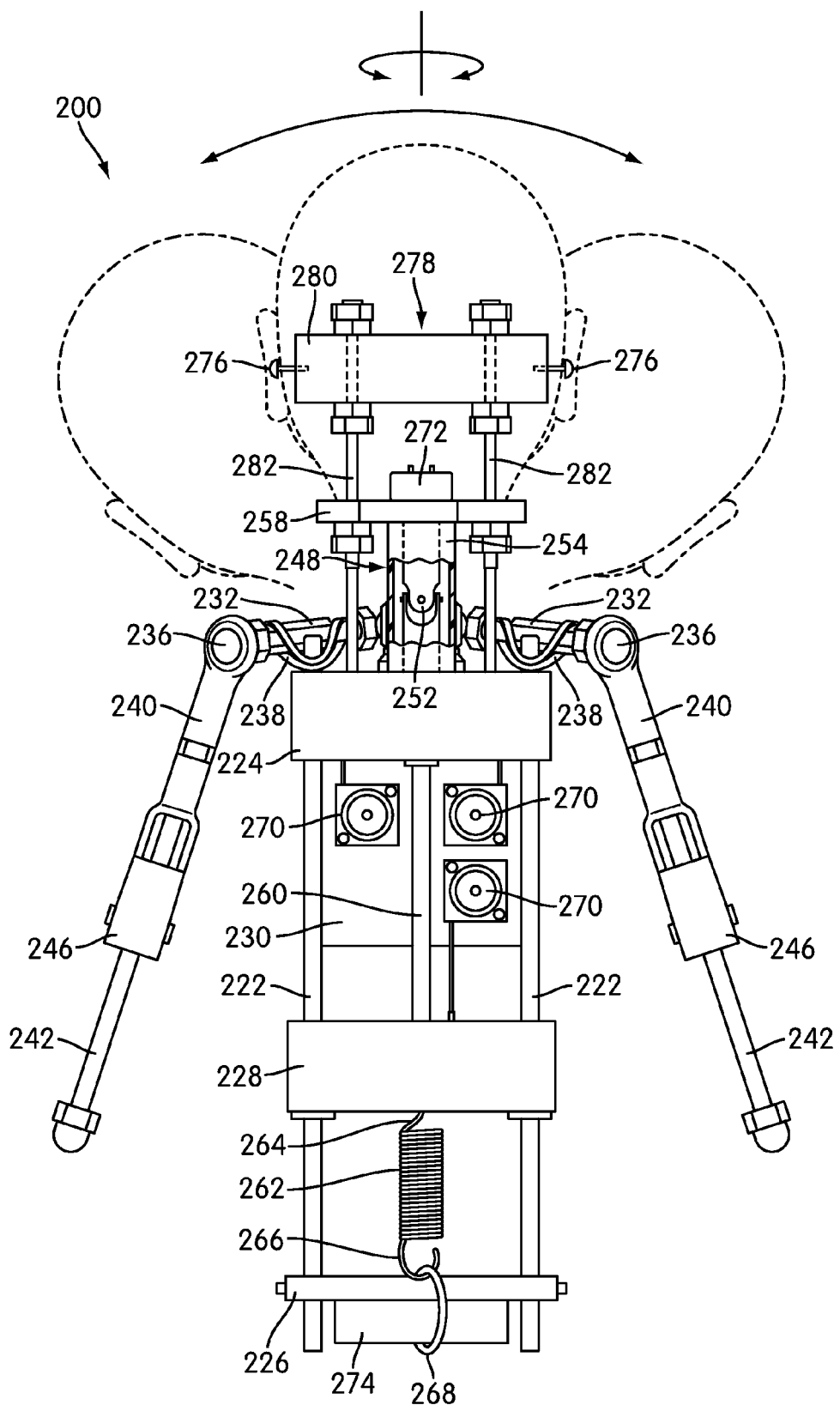
FIG. 16 is a rear skeletal view of the fetal birthing simulator of FIG. 14.

FIGS. 15 and 16 are front and rear skeletal views of the fetal birthing simulator 200 that show the interior of the body 206. The interior of the body 206 is includes a frame 220 comprised of a number of individual members made of a substantially rigid material. In the illustrated embodiment, the frame 220 is comprised of left and right lateral members 222, which have the form of cylindrical rods. Mounted between the left and right members 222 at their upper ends is an upper crosspiece 224, at the lower ends is a lower crosspiece 226, and between the fixed upper and lower crosspieces 224, 226 is a movable crosspiece 228 that is adapted to slide along the lateral members 222. A sensor compartment 230 is mounted to the upper crosspiece 224 and extends beneath it. The function of these components will be described below.

The left and right movable shoulders 202, 204 and left and right arms 210, 212 connect to an upper face of the upper crosspiece 224. More particularly, toward the centerline of the upper crosspiece 224, respective left and right clavicle members 232 are connected to corresponding first Heim (i.e., ball and socket-type) joints 234, one Heim joint 234 for each of the clavicle members 232. The clavicle members 232 extend outwardly toward the respective lateral members 222 of the frame 220. Proximate to the lateral members 222 of the frame 220, second Heim joints 236, one for each clavicle member 232, connect the clavicle members 232 with the respective left and right arms 210, 212. Connecting nuts 233 secure the clavicle members 232 to the first and second Heim joints 234, 236. Thus, the clavicle members 232 are movably mounted to the frame 220. The effective length of the clavicle members 232 can be adjusted by adjusting the position of the nuts 233.

While movable clavicle members 232 allow the shoulders 202, 204 an added degree of biofidelity (and, in particular, allow a "shrugging" motion), it is also advantageous to constrain the movement of the clavicle members 232 so as to allow a biofidelic range of motion. In the illustrated embodiment, rearward motion of the clavicle members 232 is limited by the position of the top ends of the left and right members 222 of the frame 220. Forward motion of the clavicle members 222 is constrained by elastic members 238 that attach to the frame 220 and loop around the clavicle members 222.

Each of the left and right arms 210, 212 comprises an upper arm member 240 connected to one of the second Heim joints 236 and a lower arm member 242 connected to the upper arm member 240. The upper and lower arm members 240, 242 are connected by a clevis joint 244. Motion of the clevis joint 244 is constrained by a rigid plate 246 secured to the clevis joint 244 such that the resulting range of motion simulates the range of motion of the human fetal elbow. Thus, as shown, the fetal birthing simulator 200 is capable of arm flexion and extension in a number of planes of motion. Although the arms 210, 212 of the illustrated embodiment do not include hands, other embodiments may include hands.

The illustrated embodiment of the fetal birthing simulator 200 also does not include articulated mechanical legs; rather, legs are defined by the filler material contained within the outer covering 214. However, in other embodiments, particularly if breech birth is to be simulated, legs could be constructed in much the same way as arms 210, 212.

The Heim joints 234, 236 and associated members that comprise the arms 210, 212 could be manufactured or purchased from a vendor. The McMaster-Carr company of Atlanta, Ga. (United States) is one supplier of suitable joints and associated hardware.

Typically, the frame 220, arms 210, 212, and clavicle members 232 are formed of a substantially rigid material. In the illustrated embodiment, the frame 220, arms 210, 212, and clavicle members 232 are formed of aluminum. The use of metal is advantageous because it provides weight and thus helps to give the fetal birthing simulator an appropriate overall weight. However, in other embodiments, other materials, such as plastics, may be used.

Also attached to the body 206 of the fetal birthing simulator 200 by way of a neck 248 is the fetal head 208. The head 208 is typically of a size, shape, and weight that simulate the size, shape, and weight of a full-term fetus, and it may include realistic facial features. The outermost layer of the fetal head 208 is typically made of appropriately contoured rubber. Childbirth Graphics of Waco, Tex. (United States) is one appropriate supplier of fetal heads with realistic facial features.

The innermost portion of the neck 248 is comprised of a universal joint 252, which provides the basic flexibility between the body 206 and the head 208. However, it is advantageous to add additional materials to the neck 248 in order to constrain the motion of the neck 248 to an appropriate range of motion for a fetus and in order to make the force response of the neck 248 as biofidelic as possible. In the illustrated embodiment, the universal joint 252 is surrounded by a layer of silicone tubing 254, which adds a degree of stiffness and resilience to the neck 248. The silicone tubing 254 is itself wrapped with a layer of foam padding. Additional layers may be added to the neck. For example, in another embodiment, a coil spring might be placed around the silicone tubing 254 to add additional resilience.

At its top end, the neck 248 connects to the head 208 through an interface plate 258 that is secured within and to the bottom of the head 208. One particular manner of attachment of the interface plate 258 within the head 208 is described in more detail below.

In the illustrated embodiment, the neck 248 includes an extension mechanism that allows it to elongate and resiliently return to its original length. More particularly, at its bottom end, the universal joint 252 of the neck 248 is connected to a rod 260 that passes through a central bore in the upper crosspiece 224. Below the upper crosspiece 224, the rod 260 extends downwardly and is connected to the movable crosspiece 228 in such a way that extension of the neck 208 causes a corresponding displacement of the movable crosspiece 228.

In order to enable the neck 248 to return to its original length, the movable crosspiece 228 is itself connected to an elastic member 262 that is, in turn, connected to the lower, fixed crosspiece 226. In the illustrated embodiment, the elastic member 262 is a tension coil spring with hook ends. The top hook 264 is truncated and fixed to the movable crosspiece 228; the lower hook 266 is connected to a ring 268 that encircles the lower crosspiece 226.

Although extension of the neck 248 is an advantageously biofidelic feature, it is also advantageous to limit the extension of the neck 248 to an appropriately biofidelic range of motion. In the illustrated embodiment, the sensor compartment 230 acts as a mechanical stop to limit the range of extension of the neck 248 to approximately 0.6 inches vertical.

As was described above, fetal birthing simulators 200 according to embodiments of the invention may be sized and weighted appropriately to simulate different types of fetuses. In the illustrated embodiment, the fetal birthing simulator 200 is weighted to simulate a macrosomic fetus. Although different criteria have been proposed for macrosomia, a macrosomic fetus is typically defined as one with a birth weight over 4,000 or 4,500 grams. If the components of the fetal birthing simulator 200 do not allow for a realistic weight and/or a realistic distribution of mass, then weight may be added in a variety of ways. For example, in the illustrated embodiment of the fetal birthing simulator 200, lead shot was added to particular locations in the head 208 and attached to the frame 220 of the body in order to create a qualitatively realistic weight and mass distribution. If the intended degree of biofidelity requires it, weight could be apportioned appropriately by, for example, considering the weight distribution of a macrosomic fetus, and distributing mass in the fetal birthing simulator 200 so as to match the average center of mass of a macrosomic fetus.

The fetal birthing simulator 200, with its movable shoulders, movable arms, and extensible neck, may be used to simulate many different types of deliveries in combination with the maternal birthing simulator 100. In some embodiments, sensors may be included to measure one or more kinematic or kinetic properties associated with the fetal birthing simulator 200 during a simulated delivery. As the terms are used here, the term "kinematic properties" refers to the positions or sequence of motions of the components of the fetal birthing simulator 200 in one, two, or three-dimensional space, while the term "kinetic properties" refers to the forces imparted to the components of the fetal birthing simulator 200 because of movement or external action. It may be desirable to measure a number of different kinematic and kinetic properties of the fetal simulator, including the displacement of the head relative to the body axially and laterally, head rotation, the axial and lateral traction forces on the fetal birthing simulator 200, and the strain or displacement at Erb's point (or another point along the brachial plexus). Depending on the embodiment, it may also be desirable to measure the position and displacement of the legs, or any other fetal part.

In the illustrated embodiment, the fetal birthing simulator includes three linear potentiometers 270, one rotary potentiometer 272, and a load cell 274. The three linear potentiometers 270 are string potentiometers secured within the sensor compartment 230 by appropriate bolts 276. The strings of two of the linear potentiometers 270 are connected to the interface plate 258 and are positioned such that they can simulate the lateral motion of the head. The string of one of the linear potentiometers 270 is connected to the movable crosspiece 228 to measure axial neck extension. The load cell 274 is coupled to the lower crosspiece 226 to measure forces caused by axial extension of the neck 248.

The rotary potentiometer 272 is mounted to the interface plate 258 between the head 208 and the neck 248 in such a way that one portion of the rotary potentiometer 272 rotates with the head 208 and the other is fixed to the neck 248. Specifically, the head includes a frame 278 that is fixed within by bolts inserted externally at ear level. The frame comprises a top member 280, which is the secured portion of the frame 278, and two side rods 282 that are connected to the top member 280 at top ends and to the interface plate 258 at bottom ends.

Figure 21:
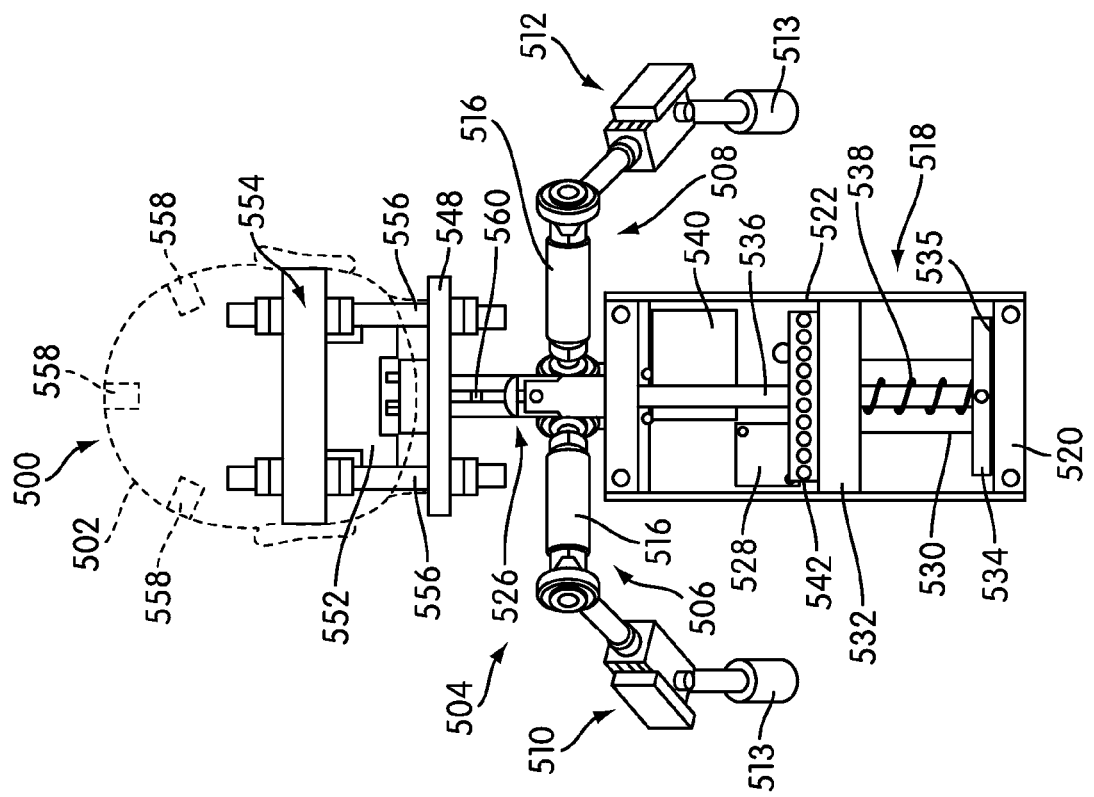
FIG. 21 is a rear elevational view of the fetal birthing simulator of FIG. 20.
Figure 20:
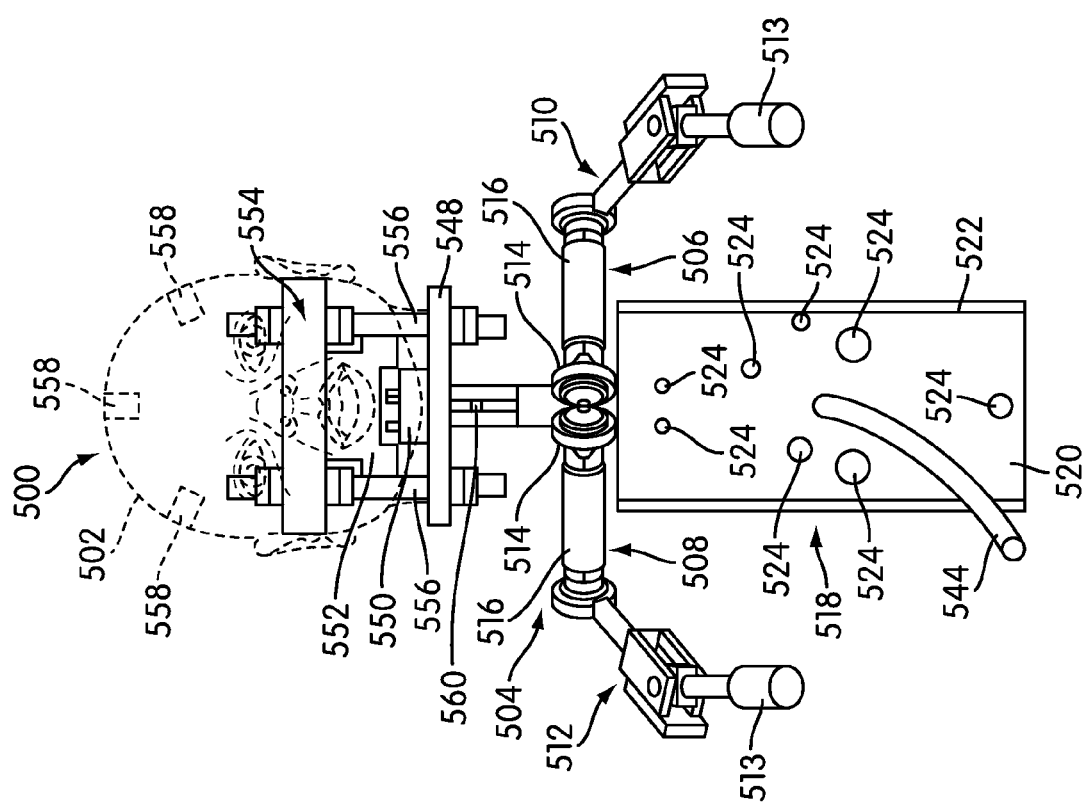
FIG. 20 is a front elevational view of a fetal birthing simulator according to another embodiment of the invention.

The arrangement and instrumentation of the fetal birthing simulator may vary from embodiment to embodiment. FIG. 20 is a front elevational view of a fetal birthing simulator 500 according to another embodiment of the invention, and FIG. 21 is a rear elevational view of the fetal birthing simulator 500. In FIGS. 20-21, no external outer covering is shown; the appearance and construction of the outer covering may be assumed to be substantially similar to that of fetal birthing simulator 200 shown in FIG. 14. Moreover, those parts not described in detail with respect to fetal birthing simulator 500 may be assumed to be substantially similar to those described above with respect to fetal birthing simulator 200.

Fetal birthing simulator 500 has a head 502 and a body, generally indicated at 504. Attached to the body 504 are left and right shoulders 506, 508 and left and right arms 510, 512 that are substantially similar to those of the fetal birthing simulator 200. One difference in the structure of fetal birthing simulator 500 as compared with fetal birthing simulator 200 is in the method of defining and constraining the range of motion in the arms 510, 512. In fetal birthing simulator 200, the first Heim joints 234 are oriented front-to-back, and elastic members 238 looped over the clavicle members 232 constrain the range of motion of the shoulders 202, 204.

However, in fetal birthing simulator 500, the first Heim joints 514 are angled outwardly in a V-shape, as shown in FIGS. 20-21. The angle of the Heim joints 514 limits the motion of the respective clavicle members 516 because the movement limits of the Heim joints 514 roughly approximate biofidelic ranges of motion when the Heim joints 514 are oriented as shown in FIGS. 20-21. Therefore, because the motion is restricted by the Heim joints 514 themselves, no elastic members 238 are provided. However, depending on its arrangement, some amount of resilient resistance to movement may be provided by the filler and covering materials.

Additionally, each arm 510, 512 includes a hand member 513 at its distal end. Although not shown in FIGS. 20 and 21, in some embodiments, the hand member 513 may be attached by a hinge joint so as to simulate the action of wrists.

At the core of the body 504 is an enclosed channel 518 that contains the various sensors in the body 504 as well as the neck extension mechanism. Whereas fetal birthing simulator 200 has a frame 220 in which the sensory and other body components are mounted, the enclosed channel 518 serves that purpose in fetal birthing simulator 500. The enclosed channel 518 provides better protection for the components and prevents any part of the mechanism from "catching" on the outer covering as it moves.

In the illustrated embodiment, the enclosed channel 518 is comprised of two parts: a C-shaped channel base 520 and a cover 522. In the illustrated embodiment, the channel base 520 is formed of aluminum and the cover 522 is formed of transparent glycol-modified polyethylene terephthalate (PETG), although in other embodiments, both components may be made of plastic, metal, wood, or any other suitable material.

The sensor components, which will be described below in greater detail, are attached to the channel base 520. As shown in FIG. 20, the channel base 520 has a number of pilot holes 524 of various sizes that allow the insertion of various fasteners to secure components to the channel base 520. Components may be attached to the channel base 520 by conventional screw or bolt fasteners, or by more easily released fasteners, such as spring pins. The channel base 520 and cover 522 are connected together in the illustrated embodiment by machine screws in appropriate locations (not shown in FIGS. 20-21), although in other embodiments, the channel base 520 and cover 522 may be secured together in any fashion. In particular, if the components inside the enclosed channel 518 are not designed to be user serviceable, the two components 520, 522 may be connected together by soldering, welding, adhesive bonding, non-removable fasteners, interference fit, or some other semi-permanent means of securement.

Figure 22:
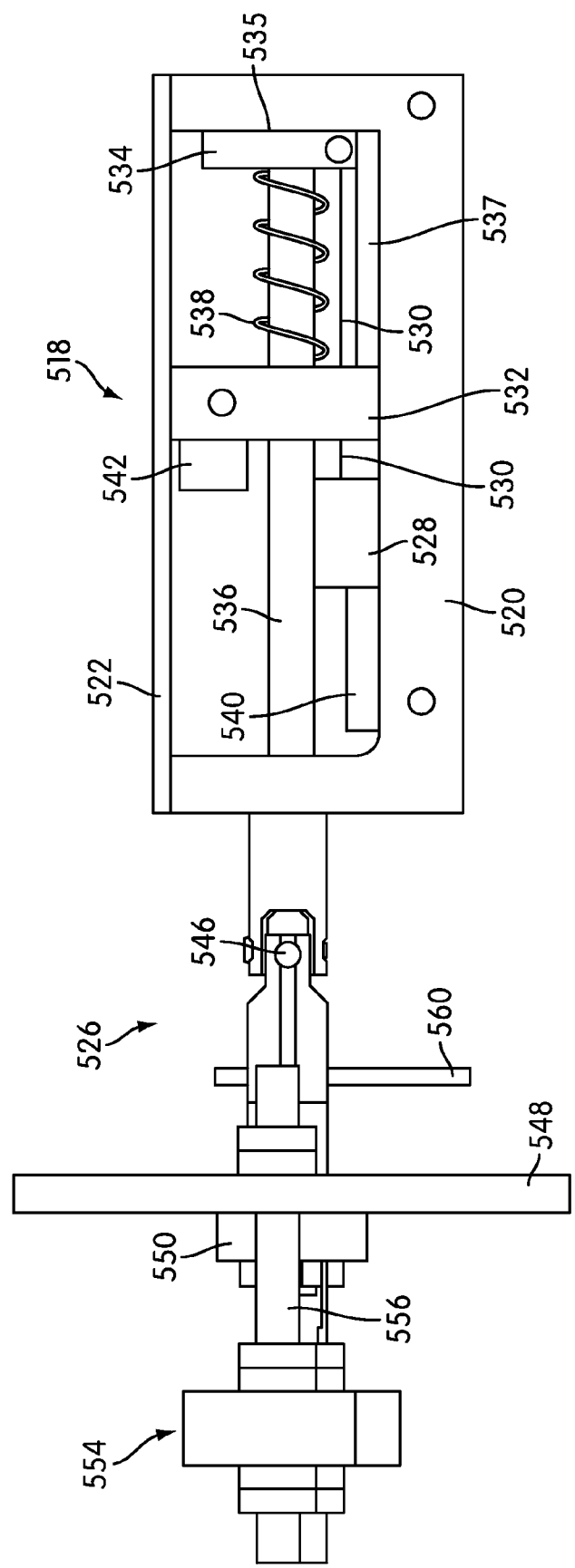
FIG. 22 is a side elevational view of the fetal birthing simulator of FIG. 20 with head and arms removed.

The various sensor components can best be seen in the rear elevational view of FIG. 21 and also in FIG. 22, which is a side elevational view of the enclosed channel 518 with the basic structures of the neck, indicated generally at 526, and some of the contiguous structures internal to the head 502. For simplicity of illustration, neither the head 502 nor the arms 510, 512 are included in FIG. 22.

Mounted within the enclosed channel 518 is a string potentiometer 528 that measures neck extension/displacement. The string 530 from the string potentiometer 528 passes downwardly, through an opening (not shown) in a fixed block 532 within the enclosed channel 518, and is attached to a moveable block 534 near the bottom.

The moveable block 534 is mounted to a rod 536 that is directly connected to the neck 526 such that extension of the neck 526 results in a one-to-one movement of the rod 536. Movement of the rod 536, in turn, moves the moveable block 534, which changes the exposed length of the string 530 and thus provides an indication of the amount of neck extension.

A resilient member in the form of a compression spring 538 is mounted generally concentrically over the rod 536 so as to bear between the fixed block 532 and the moveable block 534. In that position, the compression spring 538 resists the extension of the neck 526. The spring constant of the compression spring 538 would generally be selected so as to provide a biofidelic level of resistance to neck extension. As one example, a spring coefficient of 32 lbs/in has been found to be appropriate. In the illustrated embodiment, the ends of the compression spring 538 are not fixed; however, in other embodiments, the ends of the compression spring may be fixed in appropriate channels or grooves in the fixed block 532 and the moveable block 534, respectively.

Because of the movement of the rod 536 and moveable block 534, it may be advantageous to provide certain features that reduce wear and possible shock to the system. As an example, in the illustrated embodiment, a thin neoprene pad 535 is installed on the underside of the moveable block 534 between it and the channel base 520 to dampen any shock or mechanical impulse that might otherwise occur when the neck is released and the moveable block 534 returns rapidly to its position against the channel base 520. In other embodiments, other types of rubber may be used, and the pad 535 may be of any desired thickness.

Additionally, a low-friction block 537, TEFLON® (polytetrafluoroethylene) in the illustrated embodiment, is interposed between the channel base 520 and the moveable block 534 in order to reduce wear on those two components as the moveable block 534 moves. The low-friction block 537 may be of essentially any thickness, and in some embodiments, it may be installed in a recessed space in the channel base 520 so as to be roughly level with the bottom interior surface of the channel base 520. As those of skill in the art will understand, depending on the materials of which the moveable block 534 and other components are made and the designed lifetime of the fetal birthing simulator 500, it may not be necessary to provide wear and shock reducing features.

Also included within the enclosed channel 518 is a triaxial body accelerometer 540. In the illustrated embodiment, the body accelerometer 540 is oriented such that its X-axis is lies in the direction indicated by arrow X of FIG. 21, its Y-axis lies in the direction indicated by arrow Y of FIG. 21, and its Z-axis lies in the direction indicated by arrow Z of FIG. 21. The body accelerometer 540 outputs a voltage for each of its three axes and, under steady-state conditions, those voltages can be used as a steady-state indication of body tilt or position in three dimensions. However, in embodiments requiring dynamic measurement, the body accelerometer 540 may also be used to measure force, velocity, acceleration, or jerk, depending on how its data is processed. The body accelerometer 540 may be any accelerometer capable of the types of measurements described above and, although described here as a single component, the accelerometer 540 may be mounted to a circuit board and connected to other components on that same board, such as a voltage regulator, and appropriate signal conditioning, input and output hardware. A range of ±3 g with a sensitivity of up to 360 mV/g (using a 3.3V power supply) has been found to be suitable, although other types of accelerometers with different sensitivities may be used in other embodiments, depending on the types of simulations that are to be conducted, component cost, desired level of measurement precision, and other factors.

The body 504 also includes a terminal block 542. Although not shown in FIGS. 20 and 21, each of the sensing components within the body 504 and the head 502 connects to the terminal block 542 by means of wires. From the terminal block 542, the wires are grouped into a data umbilicus 544 and exit the body 504 through the front, as shown in FIG. 20.

The neck 526 is comprised of a universal joint 546 and is similar to the neck 248 of fetal birthing simulator 200. However, in fetal birthing simulator 500, the universal joint 546 is not enclosed by elastomeric tubing. The neck 526 terminates at an interface place 548. A rotary potentiometer 550 is mounted to the interface plate 548 between the head 502 and the neck 526 such that rotational movement of the neck will be perceived by the rotary potentiometer 550. The overall arrangement of the rotary potentiometer 550 is similar to that of the rotary potentiometer 272 of fetal birthing simulator 200. The rotary potentiometer 550 may, for example, be a 5 kΩ single-turn rotary potentiometer with a 340° measurement range (Mouser Electronics, Mansfield, Tex., United States), although other types of rotary potentiometers and rotary measurement devices may be used.

Instead of using two string potentiometers to measure the movement of the head 502, fetal birthing simulator 500 uses a single triaxial head accelerometer 552. More particularly, the head 502 of fetal birthing simulator 500 includes a frame, generally indicated at 554, similar to that of fetal birthing simulator 200. The head accelerometer 552 is oriented to the same coordinate system as the body accelerometer 540 and is secured between the two upright rods 556 of the frame 554 by clips. The head accelerometer 552 may be of the same type and sensitivity as the body accelerometer 540, or the two accelerometers 540, 552 may be of different types. The choice of head accelerometer 552 will depend in some embodiments on the amount of space available inside the head 502. If the head accelerometer 552 is mounted on a circuit board, the dimensions of the circuit board may need to be chosen to fit within the head 502.

By comparing the data output from the body accelerometer 540 and the head accelerometer 552, the precise position and orientation of the head 502 relative to the body 504 can be determined in three-dimensional space. In order to determine the absolute position of the head 502 or body 504 in three-dimensional space, and the position of one relative to the other, it is helpful to have a "baseline" position. In the illustrated embodiment, the positioning of the head 502 and body 504 shown in FIG. 20 and 21 can be considered to be the "baseline" position, with the position of the head 502 and body 504 expressed in terms of deviation or travel from those positions. In other embodiments, other types of sensors could be used to establish the position of the head 502 and body 504 relative to one another.

In order to limit rotation of the head 502, a motion stop 560, in the form of a laterally protruding rod, is fixedly attached just above the universal joint 546 of the neck 526. The position of the motion stop 560 is such that when the head 502 is rotated to an extreme, the motion stop 560 will abut the lower end of one of the upright rods 556 of the head frame 554, thus arresting the motion of the head 502.

The head 502 has one other biofidelic feature: it is weighted to a biofidelic fetal head weight. Specifically, weight packs 558 are secured to the interior of the head 502. In the illustrated embodiment, each weight pack 558 includes lead shot packed with tape and other filler so that it will not shift or rattle, and a total of three weight packs 558 have been secured to the interior of the head 502, with at least one of them near the occupant. In other embodiments, weight plates or other structures may be used to add weight instead of lead shot. The precise weight of the head 502 in any particular embodiment will depend on the type of fetus that the fetal birthing simulator 500 is designed to simulate (e.g., average or macrosomic) and the qualitative "feel" of the head 502. A total head weight of 4 lbs (approximately 1.8 kilograms) has been found to be appropriate for some embodiments.

The wiring from the rotary potentiometer 550 and the head accelerometer 552 (the wiring is not shown in the figures) passes from the head 502 down into the enclosed channel 518 and is connected to the terminal block 542. The outputs are included in the data umbilicus 544 and pass out of the enclosed channel 518. Accordingly, the terminal block 542 may provide, for example, common positive and ground terminals shared by all of the sensors 528, 540, 550, 552, a set of X,Y, and Z output terminals for each of the head and body accelerometers 540, 552, and an output terminal for each of the string potentiometer 528 and the rotary potentiometer 550. The wires that run from the head 502 into the enclosed channel 518 of the body 504 are most advantageously braided, flexible wires that are less susceptible to bending fatigue. Additionally, the individual wires may be enclosed in a larger sheath for strain relief or other protective purposes, if desired.

Figure 23:
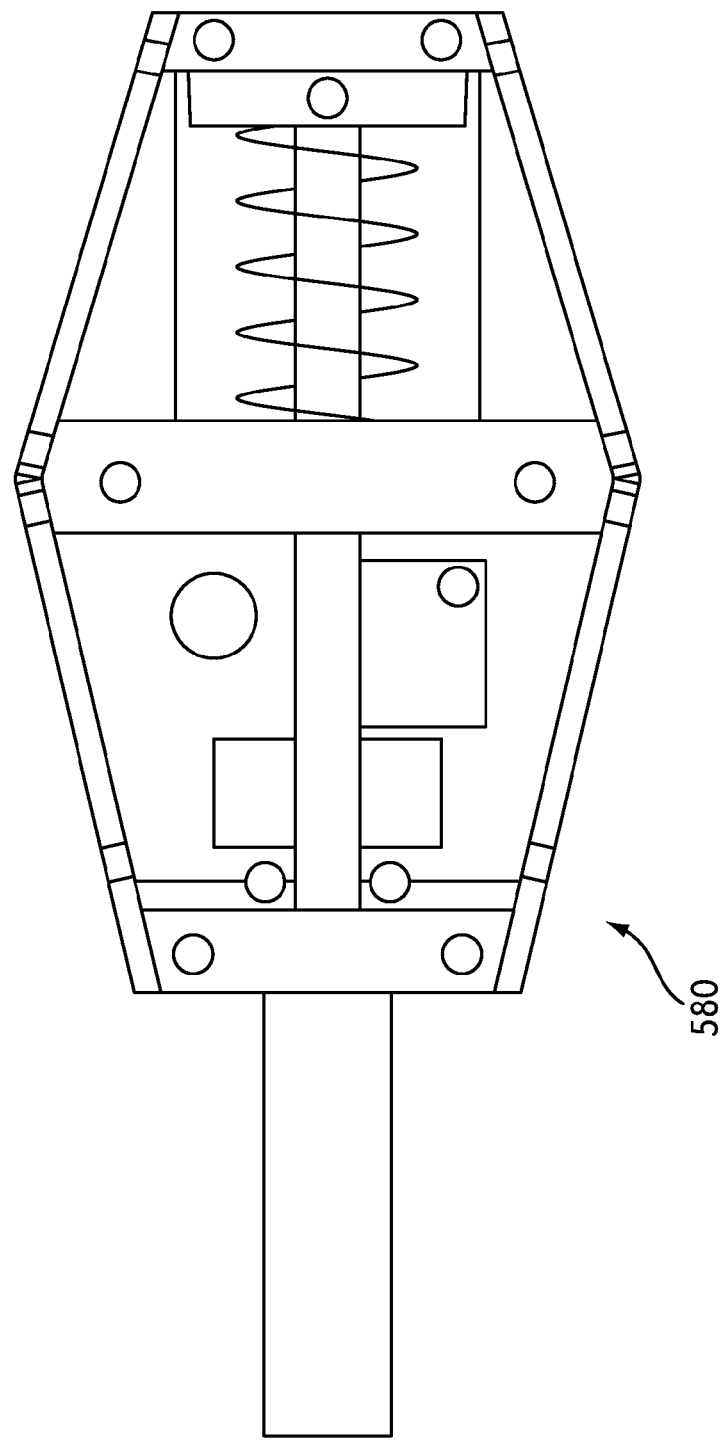
FIG. 23 is a perspective view of an enclosed channel for a fetal birthing simulator according to another embodiment of the invention.

The enclosed channel 518 of fetal birthing simulator 500 is generally rectangular in shape; however, enclosed channels need not be rectangular. FIG. 23 is a perspective view of an enclosed channel 580 that has an elongated, generally hexagonal shape. The illustrated shape of enclosed channel 580 generally simulates the shape of the fetal body—small at the neck and widening through the ribs.

Figure 17:
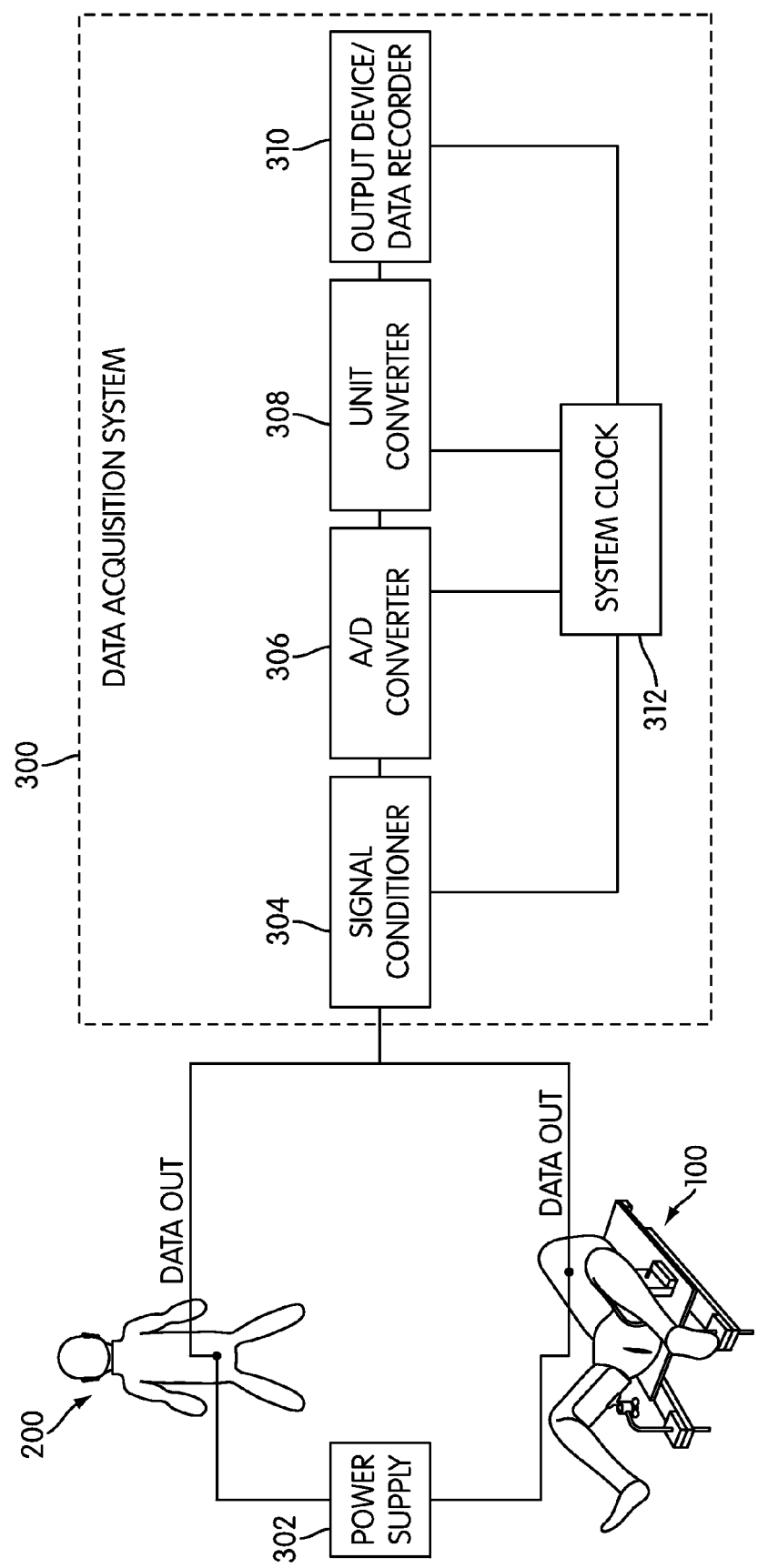
FIG. 17 is a schematic diagram of a data acquisition system that may be used with the maternal and fetal birthing simulators.

FIG. 17 is a schematic illustration of an exemplary data acquisition system, generally indicated at 300, that may be used to gather data from the maternal birthing simulator 100 and the fetal birthing simulators 200, 500 in some embodiments. As shown, the maternal birthing simulator 100 and the fetal birthing simulator 200 are both connected to a power supply 302. The power supply 302 would typically be a direct current (DC) regulated power supply. In some embodiments, the power supply 302 could be included as a part of the data acquisition system 300, although it is shown separately in FIG. 17 for the sake of clarity. The power supply provides power to each of the sensors located within the maternal birthing simulator 100 and the fetal birthing simulator 200, 500. (As was described above, connections to the fetal birthing simulators 200, 500 are through the cable 218, 544 that acts as an umbilicus.)

Data from the individual sensors within the maternal birthing simulator 100 and the fetal birthing simulator 200, 500 is conveyed to the data acquisition system 300. Generally, the connection between the data acquisition system 300 and the simulators 100, 200, 500 would be by means of data cables, although in some embodiments, a wireless communication scheme may be used.

Once data from the simulators 100, 200, 500 reaches the data acquisition system 300, it is sent through a signal conditioner 304 that performs any necessary filtering or amplification. Assuming that the data acquisition system 300 is a digital data acquisition system, the data is then sent to an analog-to-digital converter 306 that converts, for example, an analog voltage received from a sensor into a digital form. (Alternately, if the data acquisition system 300 is analog in nature, no analog-to-digital conversion is required.) Following the conversion to digital, the received data is sent to a unit converter 308 that applies a mathematical calibration curve to convert the received data from units of voltage to familiar physical measurement units, such as force, displacement, and rotation. The manner in which the unit conversion is done will vary with the properties of each sensor. Finally, once the received data is converted to physical measurement units, the data is output to an output device 310, such as a monitor, hard disk drive, plotter, or some combination of devices, for immediate display and/or later analysis. Each component in the data acquisition system 300 is coupled to a system clock 312 that ensures that the components operate in a coordinated fashion at an appropriate predetermined rate. For example, the system clock 312 could ensure that 1,000 data points per second are taken from the simulators 100, 200, 500 processed, and recorded.

The components of the data acquisition system 300 may be implemented in hardware, in software, or in any combination of hardware and software. Many off-the-shelf data acquisition systems are available. For example, the LabVIEW software package (National Instruments, Austin, Tex.) and its measurement and automation (MAX) tool along with the associated data acquisition hardware were found to be appropriate for some embodiments of the invention.

Figure 18:
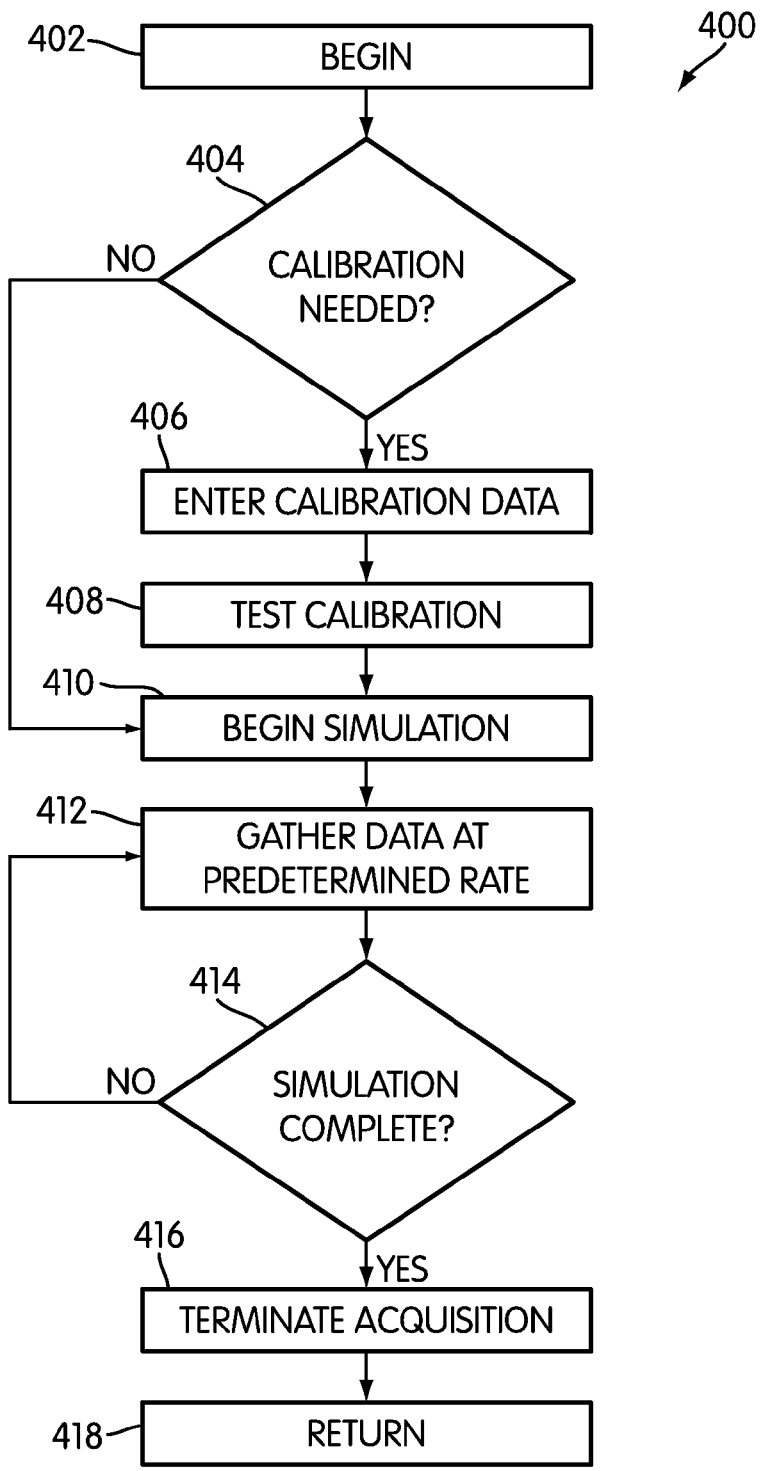
FIGS. 18-19 are flow diagrams illustrating the tasks involved in collecting data using a data acquisition system with the maternal and fetal birthing simulators.

FIG. 18 is a flow diagram of a method, generally indicated at 400, illustrating the basic tasks of data acquisition. The method 400 begins at task 402 and continues with task 404. In task 404, it is determined whether calibration of one or more sensors is needed. If calibration is needed (task 404:YES), the method 400 continues with task 406, in which calibration data is entered, and task 408, in which the entered calibration data is checked by testing the function of the sensor. After tasks 406 and 408 are complete, or if no calibration is required (task 402:NO), the maternal and fetal birthing simulators 100, 200 are set up and the simulation begins at task 410. The method then continues with task 412, in which, during the simulation, data points are gathered at a predetermined rate, for example, by using the data acquisition system 300. If multiple sensors are included in the data acquisition, the data acquisition system 300 preferably gathers a data point from each one of the sensors in a synchronized manner.

After gathering a set of data points, the method 400 continues with task 414, in which it is determined whether the simulation is complete. If the simulation is complete (task 414:YES), data acquisition is terminated in task 416 and the method 400 terminates and returns at task 418. If the simulation is not complete (task 414:NO), control of the method 400 returns to 412 and continues by gathering a data point at the predetermined rate.

The determination of whether or not the simulation is complete may be made based on a user entry to that effect, it may be made by observing the data, it may be made based on the non-functioning of one of the sensors, or it may be made based on some other error condition.

The embodiment of the data acquisition system 300 and the method 400 described above anticipate that data points will merely be collected for postprocessing and later study. However, in some embodiments, the data acquisition system 300 and associated methods could use a feedback control system to examine the data points as they are gathered and raise an alarm if a data point fell outside predetermined limits. For example, the data acquisition system 300 could inform the user if a potentially traumatic amount of traction was being applied to the neck 248 of the fetal birthing simulator 200. Additionally, in more advanced embodiments, the data may be used, for example, to automatically shut down a uterine propulsive system 158 after a certain phase of delivery.

Figure 19:
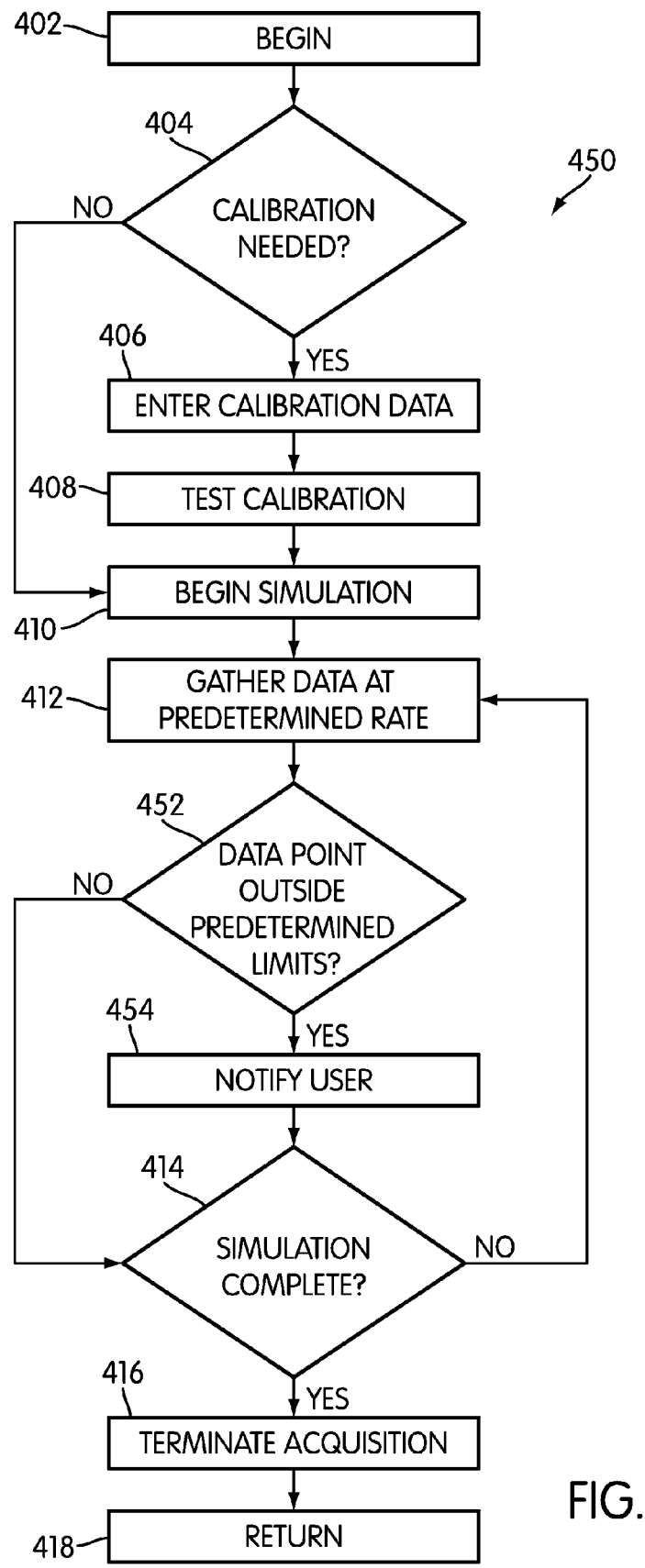

FIG. 19 is a flow diagram of a method, generally indicated at 450, that provides feedback to the user. Many of the initial tasks of method 450 are generally the same as those of the method 400, and so the description above will suffice for the common tasks. In the method 450, once data points are gathered at 412, method 450 continues with task 452, in which it is determined whether one or more of the gathered data points lie outside of predetermined limits (for example, for force, deflection, etc.). If the data points do lie outside of predetermined limits (task 452:YES), control passes to task 454, and the user is notified. If the data points do not lie outside of predetermined limits (task 452:NO), the method 450 continues in much the same manner as the method 400.

In simulating the birthing process, it can be useful to have measures and indications of brachial plexus strain. Generally speaking, greater brachial plexus strain may indicate greater likelihood of Erb's Palsy or other types of birth injuries. Moreover, knowledge of brachial plexus strain allows one to determine which birthing conditions or obstetrical procedures are more likely to generate greater strain, and thus, are more likely to increase the risk of injury. Several different methods of estimating brachial plexus nerve strain can be used with fetal birthing simulators 200, 500 according to embodiments of the invention.

Instead of placing sensors within the neck and around the shoulder to measure strain, brachial plexus nerve strain can be calculated as a function of head rotation, neck extension, and lateral flexion of the head. In a simple mathematical model, the brachial plexus and its component nerves are modeled as a single incompressible elastic string originating from the spinal cord at the level of the C5 vertebra and extending linearly to the shoulder at the acromion process. This nerve-string then passes over the acromion process as a cord would pass over a pulley and extends to the hand, where it is tethered. In this model, it is assumed that the hand is a fixed distance from the acromion process, and no changes in arm position are included in the calculations of brachial plexus strain. It is also assumed that changes in the z-direction do not affect brachial plexus strain, such that brachial plexus strain changes solely as a function of head position relative to body position. In order to calculate brachial plexus strain, the coordinates of the fifth cervical (C5) vertebra ($X_c$, $Y_c$, $Z_c$) are first established:

$$X_c = 5.39 + \Delta X + 6(1 - \cos \theta) \quad (1)$$

$$Y_c = 1 + \sin \theta \quad (2)$$

$$Z_c = 0 \quad (3)$$

Where $X_c$, $Y_c$, $Z_c$ are the coordinates of the brachial plexus, with the X-axis oriented superior-to-inferior, the Y-axis oriented medial-to-lateral, and the Z-axis oriented anterior-to-posterior. In Equation (1), $X_c$, 5.39 is the distance in centimeters from the C5 vertebra to the sternum, the delta-X term represents neck extension along the X-axis, and the remaining term represents the reduction in displacement along the X-axis due to head tilt. Similarly, Equation (2), the first term on the right side represents the distance in centimeters from the C5 vertebra to the sternum and the second term represents the increase in displacement along the Y-axis due to head tilt.

The coordinates of the acromion ($X_a$, $Y_a$, $Z_a$) are also established, as follows:

$$X_a = 0 \quad (4)$$

$$Y_a = 6 \cos \theta \quad (5)$$

$$Z_a = 6 \sin \theta \quad (6)$$

where the multiplier of "6" in Equations (5) and (6) represents half of the biacromial distance in centimeters.

With the coordinates of the fifth cervical vertebra and the coordinates of the acromion established, the length of the brachial plexus can be modeled as the straight-line distance between the fifth cervical vertebra and the acromion and calculated using a distance formula:

$$BPL = \sqrt{(X_c - X_a)^2 + (Y_c - Y_a)^2 + (Z_c - Z_a)^2} \quad (7)$$

Where "BPL" is the brachial plexus length. The resting initial length of the brachial plexus before any applied strains is termed $BPL_0$.

Once the length of the brachial plexus is known, the brachial plexus strain ($\epsilon_{BP}$), can be calculated as follows:

$$\varepsilon_{BP} = -\frac{(BPL - BPL_0)}{BPL_0} \quad (8)$$

for any brachial plexus length.

Figure 24:
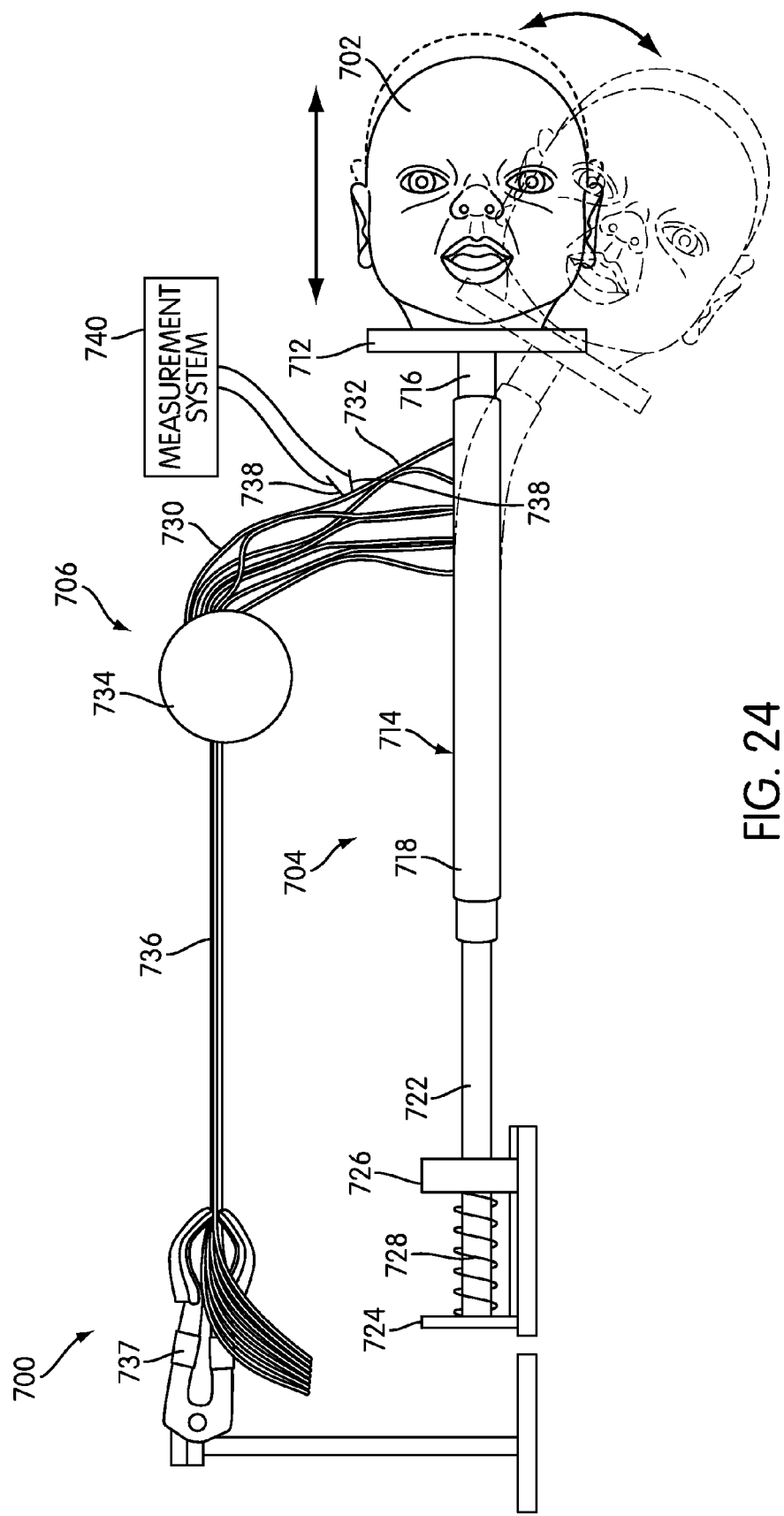
FIG. 24 is a schematic front elevational view of a brachial plexus simulator according to one embodiment of the invention.
Figure 14:
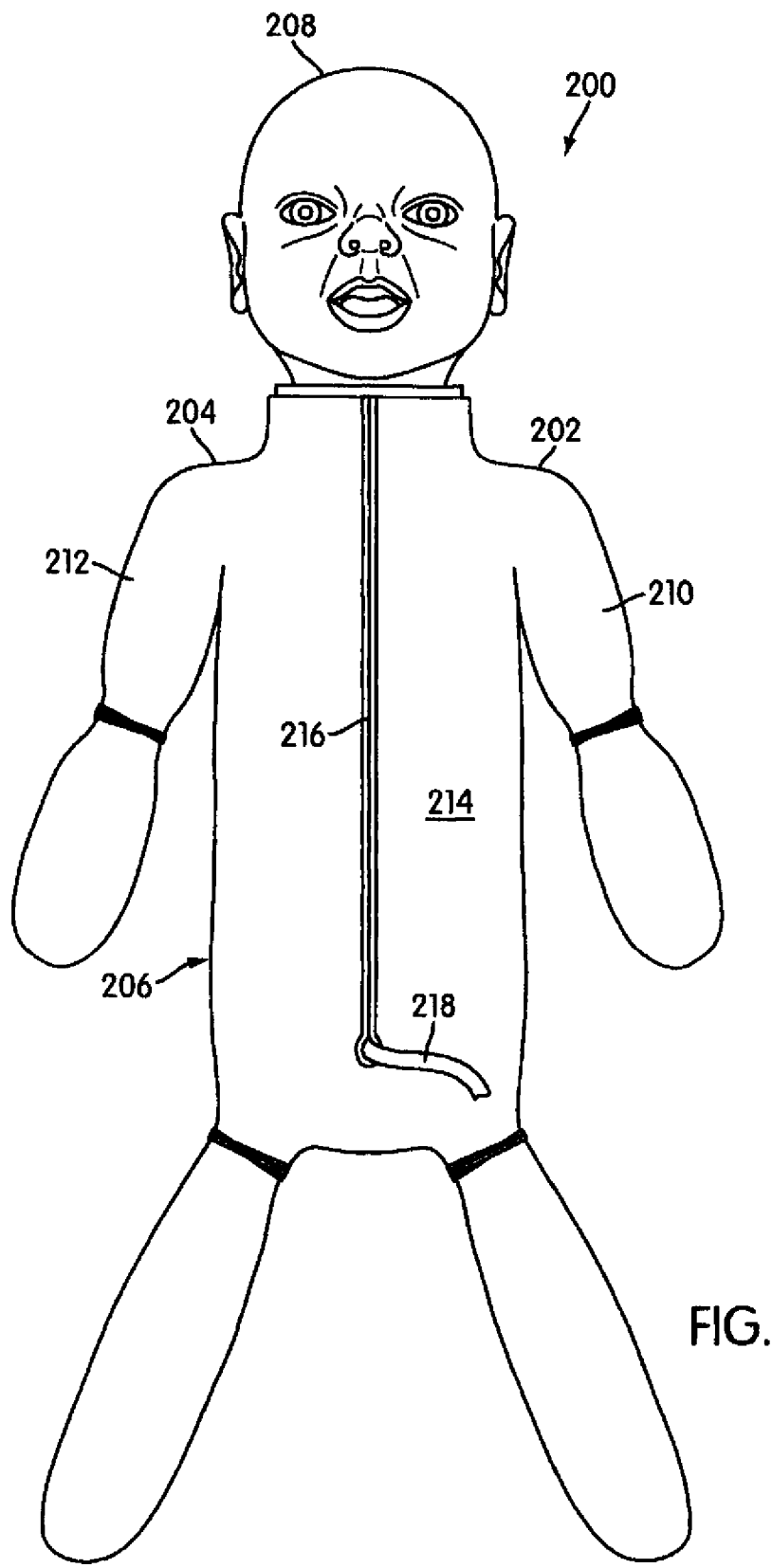

Mathematical models are useful, but in some embodiments of the invention, it may be helpful to build a physical model of the brachial plexus so as to obtain a more nuanced understanding of strain in the brachial plexus. FIG. 24 is a schematic front elevational view of a brachial plexus simulator, generally indicated at 700, according to another embodiment of the invention.

The brachial plexus simulator 700 includes a head 702, a spinal assembly 704, and a brachial plexus assembly 706. The head 702 is similar in most respects to the head 502 of fetal birthing simulator 500 and includes a single triaxial accelerometer (not shown in FIG. 24). The accelerometer is used as a steady-state tilt sensor to read the position of the head 702 in three dimensions, and may be the same as or different from the accelerometers 540, 552 of the fetal birthing simulator 500. The head 702 may be weighted, as is head 502, and it may include an internal frame similar to frame 554 in order to mount the accelerometer and any other internal components, depending on the embodiment and the desired degree of biofidelity.

At an interface plate 712, the head 702 connects to a simulated spine 714. As shown in FIG. 24, the simulated spine 714 comprises an inner bore of flexible silicone tubing 716 (in the illustrated embodiment, 0.625 inch inner diameter and 0.875 inch outer diameter) surrounded by a foam layer 718 that adds both elasticity and rigidity. Connected to the simulated spine 714 at locations appropriate to the C5-C8 and T1 vertebrae are a network of smaller nerve tubes 730 of a diameter and compliance that approximate the diameter and compliance of the brachial plexus nerves (in the illustrated embodiment, 0.040 inch inner diameter and 0.085 inch outer diameter). The nerve tubes 730 are joined to one another at physiologically appropriate points by external couplings 732 placed around the outside circumferences of the nerve tubes 730 that are to be joined. Typically, the external couplings 732 are short segments of silicone tubing with an inner diameter just greater than the outer diameter of the nerve tubes 730, such that they join the nerve tubes 730 together in a tight or interference fit. Silicone sealing compounds may also be used if necessary or desired. The overall connectivity, shape, and mechanical properties of the network of nerve tubes 730 mimic those of the brachial plexus itself. Distal to the simulated spine 714, the nerve tubes 730 pass over a mandrel 734 and converge into a single arm nerve tube 736 beyond the mandrel 734. The mandrel 734 serves the purpose of the acromion process. A clamp 737 is used to hold the nerve tube 736 at its distal end. In some embodiments, the nerve tubes 730 may connect to the simulated spine 714 by way of a number of transverse tubes that extend transversely through the simulated spine and are of a diameter intermediate that of the spine 714 and the nerve tubes 730.

As shown in FIG. 24, the simulated spine 714 connects to a rod 722 at its distal end, which terminates at a moveable block 724. A compression spring 728 bears between the moveable block 724 and a fixed block 726 in order to resist extension and to resiliently return the simulated spine 714 to its original position. Although FIG. 24 illustrates the basic arrangement of components, in some embodiments, the rod 722 may terminate within an enclosed channel 518 similar to the enclosed channel 518 of the fetal birthing simulator 500.

In order to measure large deformation strain, the nerve tubes 730 are filled with a fluid material whose resistance or other electrical properties change with its length. Mercury in its liquid state is one appropriate material, as is Galistan, an alloy of gallium, indium, and tin. To measure strains between particular points, measurement leads in the form of electrically conductive pins 738 are inserted at the desired measuring points, and the change in resistance between those points is measured and recorded by a resistance measurement system 740 as the head 702 and other portions of the brachial plexus simulator 700 are manipulated into desired positions to create the desired strains.

If the conductive fluid is mercury, it is advantageous if the pins 738 are lengths of platinum wire, because platinum resists the corrosive effects of mercury. It may also be helpful to insert the pins at angles, instead of perpendicular to the surface of the nerve tubes 730, because an angled orientation may help to prevent pin pull-out. The resistance measurement system 740 itself may be a digital multimeter with a switching system to measure simultaneously between multiple pairs of pins 738, or the resistance measurement system 740 may be a computerized data acquisition system.

Once strain data is collected from the brachial plexus simulator 700, it can be correlated with and used in simulations involving other fetal simulators 200, 500 by taking into account head position. For example, if it is determined using the brachial plexus simulator 700 that a particular position of the head 702 creates a particular amount of brachial plexus strain in a particular direction, that degree and direction of strain may be assumed in the fetal birthing simulators 200, 500 when the head 208, 502 of the fetal birthing simulator 200, 500 is in the same position. As those of skill in the art will appreciate, a brachial plexus simulator 700 such as this allows consideration of strain in particular nerves in addition to consideration of average strain in the brachial plexus as a whole.

While the invention has been described with respect to certain embodiments, the description is intended to be exemplary, rather than limiting. Modifications and changes may be made within the scope of the invention, which is determined by the appended claims.

What is claimed is:

1. A fetal brachial plexus strain simulator, comprising:
    a head;
    a head position sensor mounted within the head;
    a simulated spinal column connected to a lower portion of the head, the simulated spinal column simulating the compliance of a spinal column;
    a simulated brachial plexus comprising a network of interconnected nerve tubing connected relative to the simulated spinal column so as to simulate the location, extent, and compliance of the brachial plexus nerves in a fetus; and
    a base connected to a lower portion of the simulated spinal column;
    wherein the nerve tubing is adapted to contain a substance whose electrical properties change in response to strain, such that the simulated brachial plexus acts as its own strain gage.

2. The fetal brachial plexus strain simulator of claim 1, wherein the substance is mercury or Galinstan.

3. The fetal brachial plexus strain simulator of claim 2, further comprising a measurement system adapted to record the position of the head and the electrical properties of the substance under applied strains.

4. A method of simulating the behavior of the brachial plexus, comprising:
    inserting measurement leads into a simulated brachial plexus comprised of a network of tubing sized, connected, and positioned relative to a simulated head and a simulated spinal column so as to approximate the position, size, and compliance of the nerves of the brachial plexus, the network of tubing being filled with a fluid whose electrical properties change in response to applied strain, such that the simulated brachial plexus acts as its own strain gage; and measuring the change in electrical properties between the measurement leads as strains are applied to the network of tubing by changing the position of one or more of the simulated head, the simulated brachial plexus, and the simulated spinal column.

5. The method of claim 4, wherein the fluid is mercury or Galinstan and the change in electrical properties comprises a change in resistance between the measurement leads.

6. The method of claim 4, further comprising:
correlating the change in electrical properties between the measurement leads with the position of one or more of a second fetal head or a second fetal body in order to determine which positions of the second fetal head and the second fetal body create particular applied strains.

7. The brachial plexus simulator of claim 1, wherein the base comprises:
a fixed block;
a moveable block; and
a compression spring that bears between the fixed block and the movable block;
wherein the simulated spinal column is connected to the movable block so as to be mounted for extension along the long axis of the simulated spinal column.

8. The brachial plexus simulator of claim 1, wherein the simulated spinal column comprises:
a compliant tube; and
a stiffening layer provided around at least portions of the tube.

9. The brachial plexus simulator of claim 8, wherein the stiffening layer comprises a layer of foam.

10. The brachial plexus simulator of claim 1, wherein the head is weighted to a biofidelic weight.

11. A method of determining brachial plexus behavior, comprising:
providing a simulated head, simulated spinal column, and a simulated brachial plexus comprising a network of interconnected nerve tubing sized and positioned relative to the spinal column and the head to simulate the position, size, and compliance of a brachial plexus, the nerve tubing of the simulated brachial plexus being filled with a fluid whose properties change in response to applied strain, such that the simulated brachial plexus acts as its own strain gage;
observing the strain levels in the nerve tubing of the simulated brachial plexus in response to a movement of the simulated head or simulated spinal column; and
correlating particular simulated head or simulated spinal column positions with particular strain levels in the simulated brachial plexus.

12. The method of claim 11, wherein the electrical properties of the fluid change in response to applied strain.

13. The method of claim 12, wherein the observing comprises measuring a change in the electrical properties of the fluid.

14. The method of claim 13, wherein the measuring comprises inserting electrically conductive measurement leads into the nerve tubing at particular points to measure the change in the electrical properties.

15. The method of claim 11, wherein the observing comprises measuring a change in the properties of the fluid.

16. A method of determining simulated brachial plexus behavior in a fetal simulator, comprising:
determining the positions of a first simulated fetal head and a first simulated fetal body in one or more dimensions; and
correlating the positions of the first simulated fetal head and first simulated fetal body with brachial plexus strain data for those positions, the brachial plexus strain data having been gathered by a method including
providing a brachial plexus simulator including a second simulated head, a second simulated spinal column, and simulated brachial plexus comprising a network of interconnected nerve tubing connected relative to the second head and the second spinal column to simulate the position, size, and compliance of a brachial plexus, the nerve tubing being filled with a material whose properties change in response to strain, such that the simulated brachial plexus acts as its own strain gage;
observing the strain levels in the nerve tubing in response to a movement of the second simulated head or second simulated spinal column by measuring the change in properties of the material.

17. The method of claim 16, wherein the material is a fluid.

18. The method of claim 17, wherein the electrical properties of the fluid change in response to strain.

19. The method of claim 18, wherein the fluid is mercury or Galinstan.

20. The method of claim 16, wherein the fetal simulator of which the first simulated fetal head and first simulated fetal body are a part does not include a physical brachial plexus simulator.

* * * * *

UNITED STATES PATENT AND TRADEMARK OFFICE
CERTIFICATE OF CORRECTION

PATENT NO. : 7,632,100 B2
APPLICATION NO. : 11/623729
DATED : December 15, 2009
INVENTOR(S) : Robert Allen et al.

It is certified that error appears in the above-identified patent and that said Letters Patent is hereby corrected as shown below:

Delete Drawing Sheet 12 of 21 and substitute therefore the attached Drawing Sheet 12 of 21.

Signed and Sealed this

Twenty-sixth Day of January, 2010

David J. Kappos
*Director of the United States Patent and Trademark Office*